United States Patent
Mizuta et al.

(10) Patent No.: US 11,028,225 B2
(45) Date of Patent: Jun. 8, 2021

(54) MONOMER MIXTURE AND CURABLE COMPOSITION CONTAINING SAME

(71) Applicant: DAICEL CORPORATION, Osaka (JP)

(72) Inventors: Tomoya Mizuta, Himeji (JP); Keizo Inoue, Himeji (JP)

(73) Assignee: DAICEL CORPORATION, Osaka (JP)

( * ) Notice: Subject to any disclaimer, the term of this patent is extended or adjusted under 35 U.S.C. 154(b) by 0 days.

(21) Appl. No.: 16/615,481

(22) PCT Filed: Jul. 19, 2018

(86) PCT No.: PCT/JP2018/027110
§ 371 (c)(1),
(2) Date: Nov. 21, 2019

(87) PCT Pub. No.: WO2019/021933
PCT Pub. Date: Jan. 31, 2019

(65) Prior Publication Data
US 2020/0199293 A1 Jun. 25, 2020

(30) Foreign Application Priority Data
Jul. 28, 2017 (JP) .............................. JP2017-147076

(51) Int. Cl.
*C08G 65/26* (2006.01)
*C09D 11/101* (2014.01)
*C09D 11/30* (2014.01)

(52) U.S. Cl.
CPC ............ *C08G 65/26* (2013.01); *C09D 11/101* (2013.01); *C09D 11/30* (2013.01)

(58) Field of Classification Search
CPC ........ C09D 11/101; C09D 11/30; C08G 65/26
USPC ....................................................... 523/400
See application file for complete search history.

(56) References Cited

U.S. PATENT DOCUMENTS

| | | | |
|---|---|---|---|
| 7,375,145 B2 | 5/2008 | Akiyama et al. | |
| 7,473,720 B2 | 1/2009 | Akiyama et al. | |
| 7,858,670 B2 | 12/2010 | Akiyama et al. | |
| 2005/0113476 A1 | 5/2005 | Akiyama et al. | |
| 2007/0101898 A1 | 5/2007 | Akiyama et al. | |
| 2007/0185224 A1 | 8/2007 | Akiyama et al. | |
| 2007/0202437 A1 | 8/2007 | Ishibashi et al. | |
| 2007/0270520 A1 | 11/2007 | Akiyama et al. | |
| 2017/0158812 A1 | 6/2017 | Mizuta et al. | |

FOREIGN PATENT DOCUMENTS

| | | | | |
|---|---|---|---|---|
| JP | 2005-154734 A | 6/2005 | | |
| JP | 2007-211098 A | 8/2007 | | |
| JP | 2007-211099 A | 8/2007 | | |
| JP | 2016-27127 A | 2/2016 | | |
| JP | 2017-115072 A | 6/2017 | | |
| WO | WO 2015/111525 A1 | 7/2015 | | |
| WO | WO-2015199093 A1 * | 12/2015 | .......... | C08F 216/165 |
| WO | WO 2017/094809 A1 | 6/2017 | | |

OTHER PUBLICATIONS

Hybrid Plastics, "Product Information—EP0409", Mar. 2019 (Year: 2019).*
Decision to Grant a Patent dated May 21, 2019, issued in JP 2017-147076 with English translation.
International Search Report for PCT/JP2018/027110 dated Oct. 2, 2018.
Notice of Reasons for Refusal dated Jan. 8, 2019, issued in JP 2017-147076 with English translation.
Written Opinion of the International Searching Authority for PCT/JP2018/027110 dated Oct. 2, 2018.
Extended European Search Report dated Apr. 30, 2020, issued in counterpart European Patent Application No. 18838002.6.

* cited by examiner

*Primary Examiner* — David T Karst
(74) *Attorney, Agent, or Firm* — Birch, Stewart, Kolasch & Birch, LLP

(57) ABSTRACT

Provided is a monomer mixture that is rapidly cured to form a cured product having high hardness, excellent alkali resistance, and excellent adhesion to a substrate. The monomer mixture of the present invention is a monomer mixture containing at least: a compound represented by Formulas (a-1) and/or (a-2); a compound (2B) including two cationically polymerizable groups per molecule, at least one of the cationically polymerizable groups being an epoxy group; a compound (3B) including three or more cationically polymerizable groups per molecule, at least one of the cationically polymerizable groups being an epoxy group; and a compound represented by Formula (c-1).

18 Claims, No Drawings

MONOMER MIXTURE AND CURABLE COMPOSITION CONTAINING SAME

TECHNICAL FIELD

The present invention relates to a monomer mixture and a curable composition containing the same. The curable composition is suitably used for ultraviolet-curable inkjet inks. The present application claims priority to JP 2017-147076 filed to Japan on Jul. 28, 2017, the content of which is incorporated herein.

BACKGROUND ART

Inkjet methods, which perform printing by jetting ink droplets onto a recording medium to form recording dots, are suitably used in applications for printing a wide variety of types in small portions because a master plate is not necessary. Cationically curable inks and radically curable inks are known as inks used for printing by such inkjet methods, namely, inkjet inks.

The radically curable inks have been widely used for reasons of their fast-curing properties and numerous types of monomers therefor. However, the radically curable inks have a problem that the curing reaction is inhibited by oxygen. Particularly in the inkjet method, since the ink is discharged as small droplets to print, the ink is easily exposed to oxygen, and oxygen easily enters the ink and diffuses therein from the atmospheric air. This results in significant curing inhibition by oxygen, leading to bleed generation and a large amount of the unreacted residual monomer that causes an odor. In addition, there is another problem that adhesion to a substrate is weak, and thus the substrate surface needs to undergo processing to improve adhesion of the ink.

On the other hand, the curing of cationically curable inks is not inhibited by oxygen. In addition, cationically curable inks have superior adhesion to a substrate to that of radically curable inks. Patent Documents 1 to 3 describe that a cationically curable ink including a curable compound and a curing catalyst, if containing a vinyl ether compound including a cyclic ether backbone as a curable compound in 30 wt. % or greater of total curable compounds, can form an ink coating having excellent curability and adhesion to a substrate.

However, vinyl ether compounds including a cyclic ether backbone easily absorb moisture, and thus cationically curable inks containing a vinyl ether compound including a cyclic ether backbone in the above range is susceptible to curing inhibition by moisture and causes curing failure when used during a high humidity period or when capturing moisture from air therein during a storage process. Therefore, they are not suitable for practical use.

As a method to solve the above problems, Patent Document 4 describes limiting a content of a vinyl ether compound including a cyclic ether backbone, and blending an alternative cationically polymerizable compound in combination therewith, thereby providing a monomer mixture that is cured rapidly even in the presence of oxygen or moisture.

CITATION LIST

Patent Document

Patent Document 1: JP 2007-211098 A
Patent Document 2: JP 2007-211099 A
Patent Document 3: JP 2005-154734 A
Patent Document 4: JP 2016-27127 A

SUMMARY OF INVENTION

Technical Problem

It was found, however, that a cured product of the monomer mixture described in Patent Document 4 is still insufficient in terms of hardness. In addition, the cured product is also insufficient in terms of alkali resistance, as it was found that a print of an ultraviolet-curable ink containing the monomer mixture described in Patent Document 4 is easily erased when wiped with an alkaline chemical or the like.

Accordingly, an object of the present invention is to provide a monomer mixture that can be rapidly cured even in the presence of oxygen or moisture to form a cured product having high hardness, excellent alkali resistance, and excellent adhesion to a wide range of substrates.

Another object of the present invention is to provide a curable composition containing the monomer mixture and a curing catalyst.

Another object of the present invention is to provide a curable composition that can be used as an ultraviolet-curable inkjet ink.

Another object of the present invention is to provide a cured product or a molded article of the curable composition.

Another object of the present invention is to provide a structure including a cured product of the curable composition on a substrate.

Solution to Problem

As a result of diligent research to solve the above problems, the present inventors found that a curable composition obtained by adding a curing catalyst to a monomer mixture containing, as cationically polymerizable compounds, a particular divinyl ether compound including a cyclic ether backbone and a particular oxetane compound in particular proportions; and containing, in particular proportions, a compound (2B) including two cationically polymerizable groups per molecule, where at least one of the cationically polymerizable groups is an epoxy group; and a compound (3B) including three or more cationically polymerizable groups per molecule, where at least one of the cationically polymerizable groups is an epoxy group; has excellent curing sensitivity and is rapidly cured by ultraviolet irradiation even in the presence of oxygen or moisture to form a cured product having high hardness, excellent alkali resistance, and excellent adhesion to a substrate. The present invention has been completed based on these findings.

That is, the present invention provides a monomer mixture containing at least:

a compound represented by Formulas (a-1) and/or (a-2) below:

[Chem. 1]

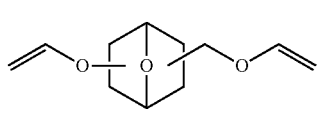

(a-1)

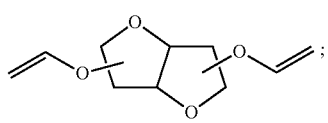

(a-2)

a compound (2B) including two cationically polymerizable groups per molecule, at least one of the cationically polymerizable groups being an epoxy group;

a compound (3B) including three or more cationically polymerizable groups per molecule, at least one of the cationically polymerizable groups being an epoxy group; and a compound represented by Formula (c-1) below:

[Chem. 2]

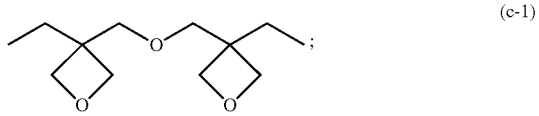

(c-1)

wherein a total content of the compound represented by Formula (a-1) above and the compound represented by Formula (a-2) above is from 1 to 20 wt. % of a total amount of the monomer mixture;

a ratio of contents of the compound (2B)/the compound (3B) is from 0.1 to 3.0; and a content of the compound represented by Formula (c-1) above is from 5 to 95 wt. % of the total amount of the monomer mixture.

The present invention also provides the monomer mixture, wherein a total content of the compound (2B) and the compound (3B) is from 10 to 50 wt. % of the total amount of the monomer mixture.

The present invention also provides the monomer mixture, wherein the compound (2B) is a compound represented by Formula (2b-1) below:

[Chem. 3]

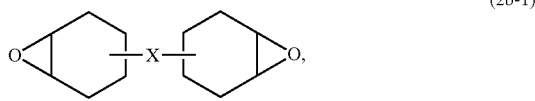

(2b-1)

where X represents a single bond or a linking group.

The present invention also provides the monomer mixture, wherein the compound (3B) is a compound (3b') including three or more glycidyl ether groups per molecule.

The present invention also provides the monomer mixture, wherein a content of a compound including only one cationically polymerizable group selected from a vinyl ether group, an epoxy group, and an oxetanyl group per molecule is 30 wt. % or less of the total amount of the monomer mixture.

The present invention also provides a curable composition containing the monomer mixture and a curing catalyst.

The present invention also provides the curable composition containing a sensitizer, or a sensitizer and a sensitization auxiliary agent.

The present invention also provides the curable composition containing a coloring material.

The present invention also provides the curable composition containing a dispersant.

The present invention also provides the curable composition, which is an ultraviolet-curable inkjet ink.

The present invention also provides a cured product of the curable composition.

The present invention also provides a molded article including the cured product.

The present invention also provides a method for producing a molded article, wherein the curable composition is discharged by an inkjet method, and then the discharged curable composition is cured to obtain a molded article including a cured product of the curable composition.

The present invention also provides a structure including the cured product on a surface of a substrate.

Advantageous Effects of Invention

The monomer mixture according to an embodiment of the present invention, including the composition described above, when mixed with a curing catalyst, can provide a curable composition that has low viscosity and thus excellent coatability or dischargeability before ultraviolet irradiation, and that can be rapidly cured by ultraviolet irradiation even in the presence of oxygen or moisture to form a cured product having high hardness, excellent alkali resistance, and excellent adhesion to a substrate. In addition, even if the curable composition has captured moisture from the air during a storage process, its curability is not impaired, namely, the curable composition has excellent storage stability. Furthermore, the curable composition has excellent curability, thus can prevent an unreacted monomer from remaining and can significantly reduce odor generation caused by the unreacted monomer. Thus, the curable composition can be suitably used as an ultraviolet-curable inkjet ink.

In addition, the curable composition, when used as an ultraviolet-curable inkjet ink, can form an ink coating in air atmosphere without limiting humidity conditions and objects to be printed, and without odor generation, the ink coating achieving very high resolution, high hardness, and excellent alkali resistance, and being not easily erased even if wiped with an alkaline chemical or the like. Thus, the curable composition can be suitably used as an ultraviolet-curable inkjet ink.

DESCRIPTION OF EMBODIMENTS

Monomer Mixture

The monomer mixture according to an embodiment of the present invention contains, as cationically polymerizable compounds (namely, compounds including a cationically polymerizable group), a compound represented by Formulas (a-1) and/or (a-2) above; a compound (2B) including two cationically polymerizable groups per molecule, where at least one of the cationically polymerizable groups is an epoxy group; a compound (3B) including three or more cationically polymerizable groups per molecule, where at least one of the cationically polymerizable groups is an epoxy group; and a compound represented by Formula (c-1) above.

The monomer mixture according to an embodiment of the present invention may contain an additional cationically polymerizable compound (a compound containing, as a cationically polymerizable group, one type or two or more types of groups selected from a vinyl ether group, an epoxy group, and an oxetanyl group) in addition to the compounds described above.

Vinyl Ether Compound (A)

A compound (A) in an embodiment of the present invention is a compound including, as a cationically polymerizable group, at least one vinyl ether group per molecule (excluding a compound including an epoxy group or an oxetanyl group).

The compound (A) includes at least a compound represented by Formulas (a-1) and/or (a-2) below.

[Chem. 4]

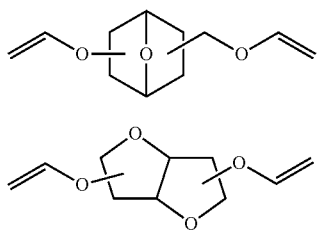

The compounds represented by Formulas (a-1) and (a-2) above can be produced using a well-known method. For example, the compound represented by Formula (a-1) above can be produced by reacting 2-hydroxy-6-hydroxymethyl-7-oxabicyclo[2.2.1]heptane with a vinyl ester compound (for example, vinyl propionate) in the presence of a transition metal compound. In addition, the compound represented by Formula (a-2) (=isosorbide divinyl ether) can be produced by the same method as described above, except that isosorbide is used in place of 2-hydroxy-6-hydroxymethyl-7-oxabicyclo[2.2.1]heptane.

The monomer mixture according to an embodiment of the present invention may contain a compound (A) other than the compound represented by Formula (a-1) above and the compound represented by Formula (a-2) above (which may be hereinafter referred to as an "additional compound (A)"). Examples of the additional compound (A) include a compound represented by Formula (a-3) below:

where R represents a t-valent hydrocarbon group, a t-valent heterocyclic group, or a t-valent group in which these groups are bonded via a single bond or a linking group; and t represents an integer of 1 or greater.

The hydrocarbon group includes aliphatic hydrocarbon groups, alicyclic hydrocarbon groups, and aromatic hydrocarbon groups.

Examples of the monovalent aliphatic hydrocarbon group include an alkyl group having from approximately 1 to 20 (preferably from 1 to 10, and particularly preferably from 1 to 3) carbons, such as a methyl group, an ethyl group, a propyl group, an isopropyl group, a butyl group, an isobutyl group, an s-butyl group, a t-butyl group, a pentyl group, a hexyl group, a decyl group, and a dodecyl group; an alkenyl group having from approximately 2 to 20 (preferably from 2 to 10, and particularly preferably from 2 to 3) carbons, such as a vinyl group, an allyl group, a methallyl group, a 1-propenyl group, an isopropenyl group, a 1-butenyl group, a 2-butenyl group, a 3-butenyl group, a 1-pentenyl group, a 2-pentenyl group, a 3-pentenyl group, a 4-pentenyl group, and a 5-hexenyl group; and an alkynyl group having from approximately 2 to 20 (preferably from 2 to 10, and particularly preferably from 2 to 3) carbons, such as an ethynyl group and a propynyl group. Examples of the t-valent aliphatic hydrocarbon group include a group in which (t–1) hydrogen atom or atoms are further removed from the structural formula of the monovalent aliphatic hydrocarbon group.

The alicyclic ring constituting the alicyclic hydrocarbon group includes a monocyclic hydrocarbon ring and a polycyclic hydrocarbon ring, and the polycyclic hydrocarbon ring includes a spiro hydrocarbon ring, a ring-assembly hydrocarbon ring, a bridged cyclic hydrocarbon ring, a fused cyclic hydrocarbon ring, and a bridged fused cyclic hydrocarbon ring. Examples of the t-valent alicyclic hydrocarbon group include a group in which t hydrogen atom or atoms are removed from the structural formula of the alicyclic ring.

Examples of the monocyclic hydrocarbon ring include $C_{3-12}$ cycloalkane rings, such as cyclopropane, cyclobutane, cyclopentane, cyclohexane, cycloheptane, and cyclooctane; and $C_{3-12}$ cycloalkene rings, such as cyclopentene and cyclohexene.

Examples of the spiro hydrocarbon ring include $C_{5-16}$ spiro hydrocarbon rings, such as spiro[4.4]nonane, spiro [4.5]decane, and spirobicyclohexane.

Examples of the ring-assembly hydrocarbon ring include a ring-assembly hydrocarbon ring containing two or more $C_{5-12}$ cycloalkane rings, such as bicyclohexane.

Examples of the bridged cyclic hydrocarbon ring include bicyclic hydrocarbon rings, such as pinane, bornane, norpinane, norbornane, norbornene, bicycloheptane, bicycloheptene, bicyclooctane (such as bicyclo[2.2.2]octane and bicyclo[3.2.1]octane); tricyclic hydrocarbon rings, such as homobredane, adamantane, tricyclo[5.2.1.0$^{2,6}$]decane, and tricyclo[4.3.1.1$^{2,5}$]undecane; tetracyclic hydrocarbon rings, such as tetracyclo[4.4.0.1$^{2,5}$.1$^{7,1o}$]dodecane and perhydro-1,4-methano-5,8-methanonaphthalene.

Examples of the fused cyclic hydrocarbon ring include fused rings in which a plurality of 5- to 8-membered cycloalkane rings are fused, such as perhydronaphthalene (decalin), perhydroanthracene, perhydrophenanthrene, perhydroacenaphthene, perhydrofluorene, perhydroindene, and perhydrophenalene.

Examples of the bridged fused cyclic hydrocarbon ring include dimers of dienes (for example, dimers of cycloalkadienes, such as cyclopentadiene, cyclohexadiene, and cycloheptadiene) and hydrogenated products thereof.

Examples of the monovalent aromatic hydrocarbon group include an aromatic hydrocarbon group having from approximately 6 to 14 (preferably from 6 to 10) carbons, such as a phenyl group and a naphthyl group. Examples of the t-valent aromatic hydrocarbon group include a group in which (t–1) hydrogen atom or atoms are further removed from the structural formula of the monovalent aromatic hydrocarbon group.

The hydrocarbon groups may include a substituent of various types [such as a halogen atom, an oxo group, a hydroxyl group, a substituted oxy group (for example, such as an alkoxy group, an aryloxy group, an aralkyloxy group, and an acyloxy group), a carboxyl group, a substituted oxycarbonyl group (such as an alkoxycarbonyl group, an aryloxycarbonyl group, and an aralkyloxycarbonyl group), a substituted or unsubstituted carbamoyl group, a cyano group, a nitro group, a substituted or unsubstituted amino group, a sulfo group, and a heterocyclic group]. The hydroxyl group and the carboxyl group may be protected by a protecting group commonly used in the field of organic synthesis. In addition, an aromatic or non-aromatic heterocyclic ring may be fused to a ring of the alicyclic hydrocarbon group or the aromatic hydrocarbon group.

Examples of the heterocyclic ring constituting the heterocyclic group include heterocyclic rings containing an oxygen atom as a heteroatom (for example, 5-membered rings, such as a furan ring, a tetrahydrofuran ring, an oxazole ring, an isooxazole ring, and a γ-butyrolactone ring; 6-membered rings, such as a 4-oxo-4H-pyran ring, a tetrahydropyran ring, and a morpholine ring; fused rings, such as a benzofuran ring, an isobenzofuran ring, a 4-oxo-4H-chromene ring, a chroman ring, and an isochroman ring; and bridged rings, such as a 3-oxatricyclo[4.3.1.1$^{4,8}$]undecane-2-one ring and a 3-oxatricyclo[4.2.1.0$^{4,8}$]nonane-2-one ring), heterocyclic rings containing a sulfur atom as a heteroatom (for example, 5-membered rings, such as a thiophene ring, a thiazole ring, an isothiazole ring, and a thiadiazole ring; 6-membered rings, such as 4-oxo-4H-thiopyran ring; and fused rings, such as a benzothiophene ring), and heterocyclic rings containing a nitrogen atom as a heteroatom (for example, 5-membered rings, such as a pyrrole ring, a pyrrolidine ring, a pyrazole ring, an imidazole ring, and a triazole ring; 6-membered rings, such as a pyridine ring, a pyridazine ring, a pyrimidine ring, a pyrazine ring, a piperidine ring, and a piperazine ring; and fused rings, such as an indole ring, an indoline ring, a quinoline ring, an acridine ring, a naphthyridine ring, a quinazoline ring, and a purine ring). In addition to the substituents that the hydrocarbon group may include, the heterocyclic group may include an alkyl group (for example, such as a $C_{1-4}$ alkyl group, such as a methyl group or an ethyl group), a cycloalkyl group, an aryl group (for example, such as a phenyl group or a naphthyl group), or the like. Examples of the t-valent heterocyclic group include a group in which t hydrogen atom or atoms are removed from the structural formula of the heterocyclic ring.

Examples of the linking group include a carbonyl group (—CO—), an ether bond (—O—), a thioether bond (—S—), an ester bond (—COO—), an amide bond (—CONH—), a carbonate bond (—OCOO—), a silyl bond (—Si—), and a group in which a plurality of these groups are linked.

The above t is an integer of 1 or greater, for example, from 1 to 20, and preferably from 1 to 10.

Specific examples of the additional compound (A) include methyl vinyl ether, ethyl vinyl ether, n-propyl vinyl ether, allyl vinyl ether, isopropyl vinyl ether, n-butyl vinyl ether, isobutyl vinyl ether, tert-butyl vinyl ether, n-pentyl vinyl ether, isopentyl vinyl ether, tert-pentyl vinyl ether, n-hexyl vinyl ether, isohexyl vinyl ether, 2-ethylhexyl vinyl ether, n-heptyl vinyl ether, n-octyl vinyl ether, nonyl vinyl ether, decyl vinyl ether, dodecyl vinyl ether, hexadecyl vinyl ether, octadecyl vinyl ether, ethoxymethyl vinyl ether, 2-methoxy ethyl vinyl ether, 2-ethoxyethyl vinyl ether, 2-buthoxyethyl vinyl ether, acetoxymethyl vinyl ether, 2-acetoxyethyl vinyl ether, 3-acetoxypropyl vinyl ether, 4-acetoxybutyl vinyl ether, 4-ethoxybutyl vinyl ether, 2-(2-methoxyethoxy)ethyl vinyl ether, 5-hydroxypentyl vinyl ether, 6-hydroxyhexyl vinyl ether, ethylene glycol monovinyl ether, diethylene glycol monovinyl ether, diethylene glycol methyl vinyl ether, diethylene glycol ethyl vinyl ether, triethylene glycol monovinyl ether, tetraethylene glycol monovinyl ether, polyethylene glycol monovinyl ether, propylene glycol monovinyl ether, dipropylene glycol monovinyl ether, tripropylene glycol monovinyl ether, polypropylene glycol monovinyl ether, butylene glycol monovinyl ether, 4-hydroxycyclohexyl vinyl ether, cyclohexyldimethanol monovinyl ether, trimethylolpropane monovinyl ether, ethylene oxide-added trimethylolpropane monovinyl ether, pentaerythritol monovinyl ether, ethylene oxide-added pentaerythritol monovinyl ether, cyclohexyl vinyl ether, cyclohexylmethyl vinyl ether, cyclohexylethyl vinyl ether, menthyl vinyl ether, tetrahydrofurfuryl vinyl ether, norbornenyl vinyl ether, 1-adamantyl vinyl ether, 2-adamantyl vinyl ether, phenyl vinyl ether, benzyl vinyl ether, 1-naphthyl vinyl ether, 2-naphthyl vinyl ether, glycidyl vinyl ether, diethylene glycol ethyl vinyl ether, triethylene glycol methyl vinyl ether, divinyl ether, ethylene glycol divinyl ether, diethylene glycol divinyl ether, triethylene glycol divinyl ether, tetraethylene glycol divinyl ether, polyethylene glycol divinyl ether, propylene glycol divinyl ether, dipropylene glycol divinyl ether, tripropylene glycol divinyl ether, polypropylene glycol divinyl ether, butanediol divinyl ether, neopentyl glycol divinyl ether, hexanediol divinyl ether, nonanediol divinyl ether, hydroquinone divinyl ether, 1,4-cyclohexanediol divinyl ether, 1,4-cyclohexane dimethanol divinyl ether, trimethylol propane divinyl ether, ethylene oxide-added trimethylol propane divinyl ether, pentaerythritol divinyl ether, ethylene oxide-added pentaerythritol divinyl ether, trimethylol propane trivinyl ether, ethylene oxide-added trimethylol propane trivinyl ether, pentaerythritol trivinyl ether, ethylene oxide-added pentaerythritol trivinyl ether, pentaerythritol tetravinyl ether, ethylene oxide-added pentaerythritol tetravinyl ether, ditrimethylol propane tetravinyl ether, and dipentaerythritol hexavinyl ether.

The additional compound (A) is, among others, preferably a vinyl ether compound including an aliphatic backbone [for example, a vinyl ether compound in which R in Formula (a-3) is an aliphatic hydrocarbon group or a group in which two or more aliphatic hydrocarbon groups are bonded via a linking group (for example, an ether bond)] in terms of having fast-curing properties and being able to form a cured product having excellent toughness.

A sum of contents of the compound represented by Formula (a-1) above, the compound represented by Formula (a-2) above, and the vinyl ether compound including an aliphatic backbone is, for example, 70 wt. % or greater, preferably 80 wt. % or greater, particularly preferably 90 wt. % or greater, and most preferably 95 wt. % or greater of a total amount of the compound (A) included in the monomer mixture according to an embodiment of the present invention, with the upper limit of 100 wt. %.

Epoxy Compound (B)

A compound (B) in an embodiment of the present invention is a compound including, as a cationically polymerizable group, at least one epoxy group per molecule. The compound (B) may include, as a cationically polymerizable group, an additional cationically polymerizable group (for example, such as a vinyl ether group and an oxetanyl group) in addition to an epoxy group. Here, the epoxy group is a group including a 3-membered cyclic ether structure (oxirane ring structure).

The monomer mixture according to an embodiment of the present invention contains, as the compounds (B), a compound (2B) including two cationically polymerizable groups per molecule, where at least one of the cationically polymerizable groups is an epoxy group; and a compound (3B) including three or more cationically polymerizable groups per molecule, where at least one of the cationically polymerizable groups is an epoxy group.

The monomer mixture according to an embodiment of the present invention may contain, as the compound (B), in addition to the compound (2B) and the compound (3B), a compound including, as a cationically polymerizable group, one epoxy group per molecule and including no cationically polymerizable group other than the epoxy group.

The epoxy group includes a group constituted of adjacent two carbon atoms constituting an alicyclic ring (for example, a 3- to 8-membered alicyclic ring) and an oxygen atom, such as a cyclohexene oxide group represented by Formula (e-1) below (which may be hereinafter referred to as an "alicyclic epoxy group"), or an ethylene oxide group represented by Formula (e-2) below. In the formula below, $R^1$ represents a hydrogen atom or a $C_{1-3}$ alkyl group.

[Chem. 5]

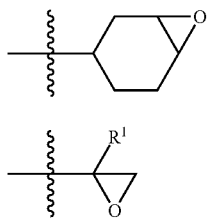

(e-1)

(e-2)

The compound (2B) is a compound including two cationically polymerizable groups per molecule, where at least one of the cationically polymerizable groups is an epoxy group, and, among others, preferably a compound (2B') including two epoxy groups per molecule, particularly preferably a compound (2b) including two alicyclic epoxy groups per molecule, and most preferably a compound (2b') including two cyclohexene oxide groups per molecule.

The compound (2B) (preferably the compound (2B'), particularly preferably the compound (2b), and most preferably the compound (2b')) preferably includes a compound represented by Formula (2b-1) below:

[Chem. 6]

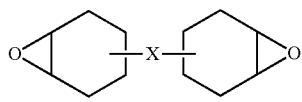

(2b-1)

In Formula (2b-1) above, X represents a single bond or a linking group. Examples of the linking group include a divalent hydrocarbon group, an alkenylene group in which some or all of the carbon-carbon double bonds are epoxidized, a carbonyl group (—CO—), an ether bond (—O—), an ester bond (—COO—), a carbonate bond (—OCOO—), an amide bond (—CONH—), and a group in which a plurality of these are linked.

Examples of the divalent hydrocarbon group include linear or branched alkylene groups having from 1 to 18 carbons and divalent alicyclic hydrocarbon groups having from 3 to 18 carbons. Examples of the linear or branched alkylene group having from 1 to 18 carbons include a methylene group, a methyl methylene group, a dimethyl methylene group, an ethylene group, a propylene group, and a trimethylene group. Examples of the divalent alicyclic hydrocarbon group having from 3 to 18 carbons include cycloalkylene groups (including cycloalkylidene groups), such as a 1,2-cyclopentylene group, a 1,3-cyclopentylene group, a cyclopentylidene group, a 1,2-cyclohexylene group, a 1,3-cycloalkylene group, a 1,4-cyclohexylene group, and a cyclohexylidene group.

Examples of the alkenylene group in the alkenylene group in which some or all of the carbon-carbon double bonds are epoxidized (which may be referred to as an "epoxidized alkenylene group") include linear or branched alkenylene groups having from 2 to 8 carbons, such as a vinylene group, a propenylene group, a 1-butenylene group, a 2-butenylene group, a butadienylene group, a pentenylene group, a hexenylene group, a heptenylene group, and an octenylene group. In particular, the epoxidized alkenylene group is preferably an alkenylene group in which all of the carbon-carbon double bonds are epoxidized, and more preferably an alkenylene group having from 2 to 4 carbons in which all of the carbon-carbon double bonds are epoxidized.

A substituent may be bonded to the cyclohexene oxide group in Formula (2b-1) above, and examples of the substituent include a halogen atom, a hydroxyl group, a $C_{1-10}$ alkyl group, a $C_{1-10}$ alkoxy group, a $C_{2-10}$ alkenyloxy group, a $C_{6-14}$ aryloxy group, a $C_{7-18}$ aralkyloxy group, a $C_{1-10}$ acyloxy group, a $C_{1-10}$ alkoxycarbonyl group, a $C_{6-14}$ aryloxycarbonyl group, a $C_{7-18}$ aralkyloxycarbonyl group, a $C_{1-10}$ acyl group, an isocyanate group, a sulfo group, a carbamoyl group, and an oxo group.

Representative examples of the compound represented by Formula (2b-1) above include (3,4,3',4'-diepoxy)bicyclohexyl, bis(3,4-epoxycyclohexylmethyl)ether, 1,2-epoxy-1,2-bis(3,4-epoxycyclohexan-1-yl)ethane, 2,2-bis(3,4-epoxycyclohexan-1-yl)propane, 1,2-bis(3,4-epoxycyclohexan-1-yl)ethane, and compounds represented by Formulas (2b-1-1) to (2b-1-8) below, where L in Formula (2b-1-5) below represents an alkylene group having from 1 to 8 carbons (for example, a linear or branched alkylene group having from 1 to 3 carbons, such as a methylene group, an ethylene group, a propylene group, and an isopropylene group); and $n^1$ and $n^2$ in Formulas (2b-1-5) and (2b-1-7) below each represent an integer of 1 to 30.

[Chem. 7]

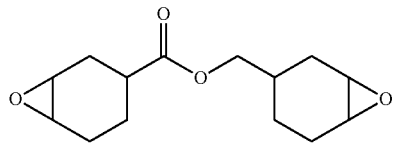

(2b-1-1)

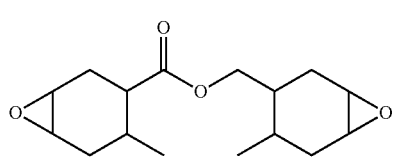

(2b-1-2)

(2b-1-3)

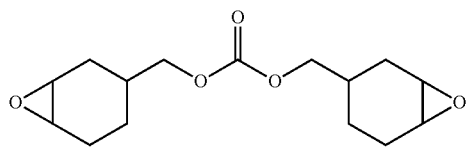

(2b-1-4)

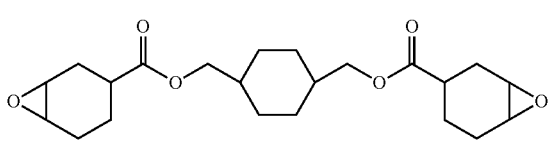

(2b-1-5)

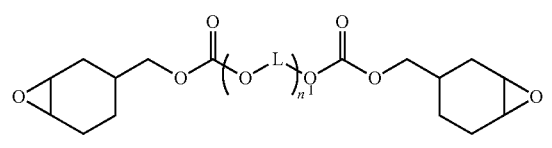

(2b-1-6)

(2b-1-7)

(2b-1-8)

The compound (2B) may include, in addition to the compound represented by Formula (2b-1) above, one type or two or more types of compounds, for example, a compound including one ethylene oxide group or alicyclic epoxy group per molecule and one vinyl ether group or oxetanyl group per molecule; a compound including two ethylene oxide groups (in particular, glycidyl ether groups) per molecule, such as bisphenol A diglycidyl ether, hydrogenated bisphenol A diglycidyl ether, ethylene glycol diglycidyl ether, diethylene glycol diglycidyl ether, propylene glycol diglycidyl ether, tripropylene glycol diglycidyl ether, neopentyl glycol diglycidyl ether, and 1,6-hexanediol diglycidyl ether; and a compound including one ethylene oxide group and one alicyclic epoxy group per molecule, such as 1,2:8,9-diepoxylimonene.

In terms of, among others, being able to form a cured product having high hardness and excellent adhesion to a substrate, and having excellent alkali resistance, the compound (2B) includes the compound (2b) in an amount of, for example, preferably 70 wt. % or greater, more preferably 80 wt. % or greater, particularly preferably 90 wt. % or greater, and most preferably 95 wt. % or greater of a total amount of the compound (2B), with the upper limit of 100 wt. %.

In addition, in terms of being able to further improve alkali resistance of the resulting cured product, the compound (2B) includes the compound represented by Formula (2b-1) above in an amount of, for example, preferably 50 wt. % or greater, more preferably 60 wt. % or greater, even more preferably 70 wt. % or greater, particularly preferably 80 wt. % or greater, most preferably 90 wt. % or greater, and especially preferably 95 wt. % or greater of the total amount of the compound (2B), with the upper limit of 100 wt. %.

The compound (3B) is a compound including three or more cationically polymerizable groups per molecule, where at least one of the cationically polymerizable groups is an epoxy group, and, among others, preferably a compound (3B') including three or more epoxy groups per molecule, particularly preferably a compound (3b) including three or more ethylene oxide groups per molecule, and especially preferably a compound (3b') including three or more glycidyl ether groups per molecule.

The compound (3b') is, for example, represented by Formula (3b-1) below:

[Chem. 8]

(3b-1)

$$R'\text{-}(\text{O}\text{-}\triangle)_s$$

where R' represents an s-valent hydrocarbon group or an s-valent group in which two or more hydrocarbon groups are bonded via an ether bond, and s represents an integer of 3 or greater.

Examples of the hydrocarbon group in R' include the same examples as those for R in Formula (a-3) above, where s represents an integer of 3 or greater, for example, preferably an integer of 3 to 6. In addition, the hydrocarbon group in R' may include a substituent of various types, and examples of the substituent include a substituent that R in Formula (a-3) above may include, an epoxy group-containing group, and an oxetanyl group-containing group.

Examples of the compound (3b') include trimethylolethane triglycidyl ether, trimethylolpropane triglycidyl ether, pentaerythritol triglycidyl ether, pentaerythritol tetraglycidyl ether, glycerin triglycidyl ether, and dipentaerythritol hexaglycidyl ether.

The compound (3B) may include, in addition to the compound (3b) (in particular, the compound (3b')), for example, a compound including three or more alicyclic epoxy groups per molecule and a compound including a total of three or more of an ethylene oxide group, such as a glycidyl ether group, and an alicyclic epoxy group per molecule, but a content of the compound (3b) (in particular, the compound (3b')) is, for example, preferably 70 wt. % or greater, more preferably 80 wt. % or greater, particularly preferably 90 wt. % or greater, and most preferably 95 wt. % or greater of a total amount of the compound (3B), with the upper limit of 100 wt. %.

Examples of the compound including three or more alicyclic epoxy groups per molecule include alicyclic epoxy compounds including a polyester backbone or a polycaprolactone backbone, such as a compound represented by Formula (3b-2) below and a compound represented by Formula (3b-3) below, and alicyclic epoxy modified siloxane compounds, such as a compound represented by Formula (3b-4) below, where $n^3$ to $n^8$ in Formulas (3b-2) and (3b-3) below represent the same or different integers from 1 to 30.

[Chem. 9]

(3b-2)

(3b-3)

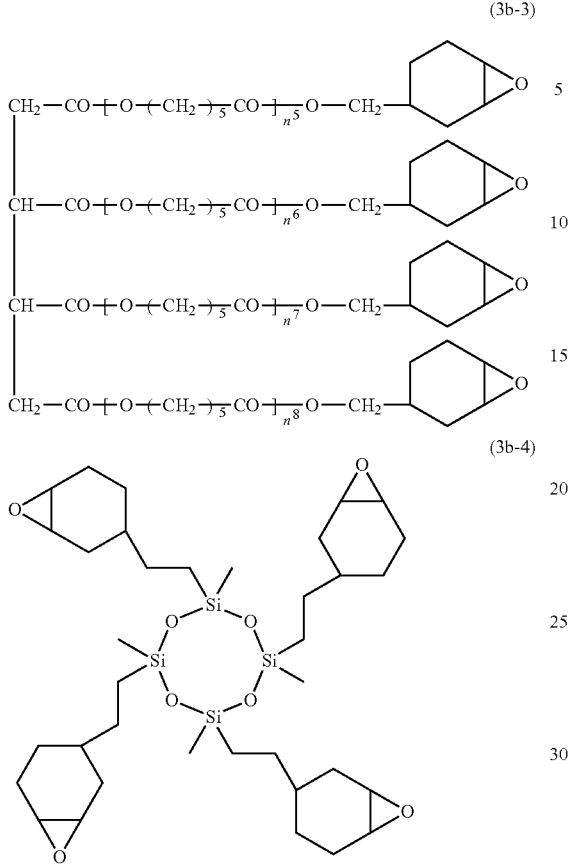

(3b-4)

Oxetane Compound (C)

A compound (C) in an embodiment of the present invention is a compound including, as a cationically polymerizable group, at least one oxetanyl group per molecule, excluding a compound including an epoxy group. The compound (C) may include, as a cationically polymerizable group, an additional cationically polymerizable group (for example, such as a vinyl ether group) in addition to an oxetanyl group. Here, the oxetanyl group is a group including a 4-membered cyclic ether structure (trimethylene oxide ring structure).

The compound (C) includes at least a compound represented by Formula (c-1) below (=bis[1-ethyl(3-oxetanyl)] methyl ether). In an embodiment of the present invention, a commercially available product can be used, for example, such as "Aron oxetane OXT-221" (available from Toagosei Co., Ltd.).

[Chem. 10]

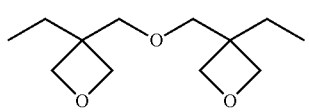

(c-1)

The monomer mixture according to an embodiment of the present invention may contain a compound (C) other than the compound represented by Formula (c-1) above (which may be hereinafter referred to as an "additional compound (C)"). Examples of the additional compound (C) include a compound represented by Formula (c-2) below:

[Chem. 11]

(c-2)

where $R^a$ represents a monovalent organic group, $R^b$ represents a hydrogen atom or an ethyl group, and m represents an integer of 0 or greater.

The monovalent organic group in the $R^a$ includes a monovalent hydrocarbon group, a monovalent heterocyclic group, a substituted oxycarbonyl group (such as an alkoxycarbonyl group, an aryloxycarbonyl group, an aralkyloxycarbonyl group, and a cycloalkyloxycarbonyl group), a substituted carbamoyl group (such as an N-alkylcarbamoyl group and an N-arylcarbamoyl group), an acyl group (an aliphatic acyl group, such as an acetyl group; and an aromatic acyl group, such as a benzoyl group), and a monovalent group in which two or more of these groups are bonded via a single bond or a linking group.

The monovalent hydrocarbon group includes a monovalent aliphatic hydrocarbon group, a monovalent alicyclic hydrocarbon group, and a monovalent aromatic hydrocarbon group. Examples of these groups include the same examples as those for the monovalent groups in R in Formula (a-3) above. In addition, these groups may include a substituent, and examples of the substituent include the same examples as those for the substituent groups that R in Formula (a-3) above may include.

Examples of the heterocyclic ring that constitutes the monovalent heterocyclic group include an oxetane ring in addition to the same examples as those for the heterocyclic ring in R in Formula (a-3) above. Examples of the linking group include the same examples as those for the linking group in R in Formula (a-3) above.

The above m represents an integer of 0 or greater, for example, from 0 to 20, and preferably from 0 to 1.

Examples of the compound represented by Formula (c-2) above include compounds represented by Formulas (c-2-1) to (c-2-14) below.

[Chem. 12]

(c-2-1)

(c-2-2)

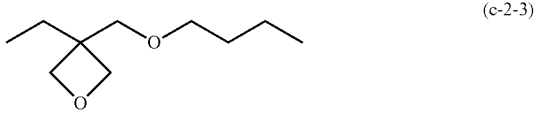

(c-2-3)

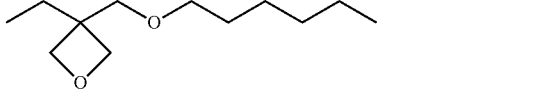

(c-2-4)

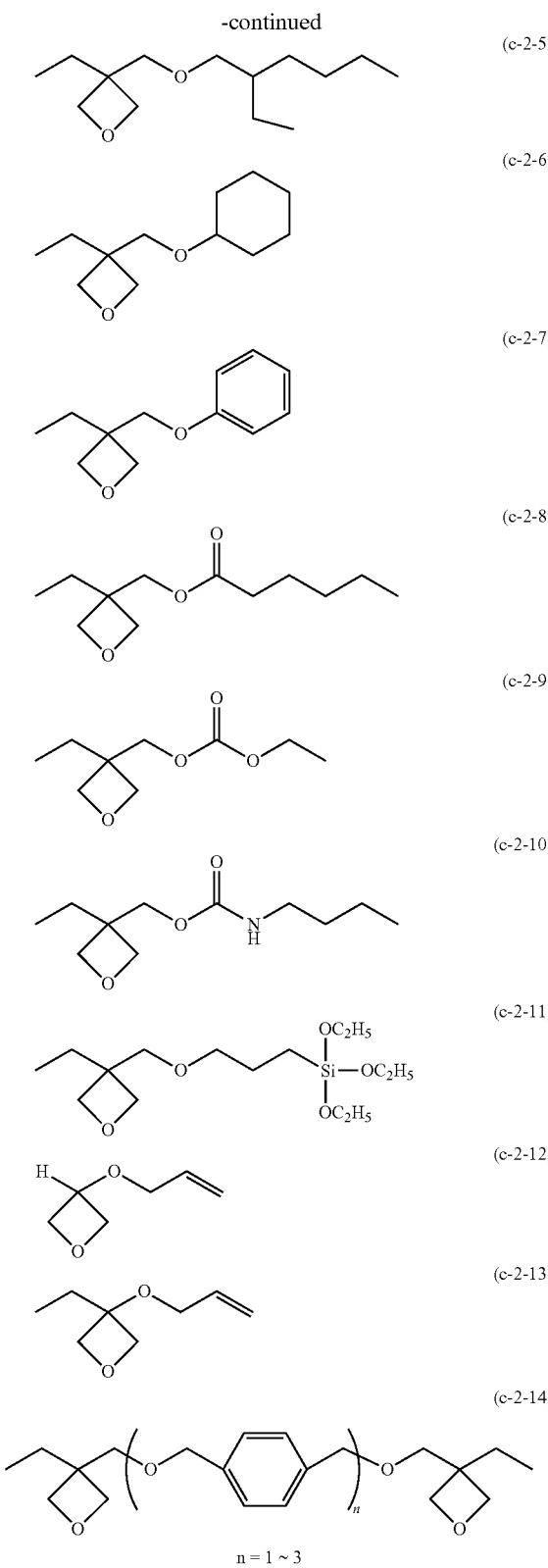

The monomer mixture according to an embodiment of the present invention preferably contains, as a compound (C), a compound represented by Formula (c-2-14) above (for example, a compound including two or more oxetanyl groups per molecule (excluding the compound represented by Formula (c-1) above), such as "Aron oxetane OXT-121" available from Toagosei Co., Ltd.) in terms of being able to form a cured product having high hardness, excellent adhesion to a substrate, and excellent alkaline resistance.

In addition, the monomer mixture according to an embodiment of the present invention preferably contains, as the additional compound (C), one type or two or more types of compounds having a viscosity of 10 mPa·s or less at 25° C. in terms of being able to reduce the viscosity of the monomer mixture and impart good coatability without impairing the curing sensitivity and the alkali resistance of the resulting cured product. The compound has a viscosity of 10 mPa·s or less and a boiling point of, for example, preferably 80° C. or higher under normal pressure (particularly preferably 100° C. or higher and most preferably 120° C. or higher, with the upper limit of the boiling point being, for example, 200° C., preferably 180° C., and particularly preferably 150° C.), in terms of being able to prevent volatilization under an environment at room temperature to a temperature during coating to maintain the viscosity of the monomer mixture, thereby allowing the prevention of void generation.

Examples of the compound include compounds including one oxetanyl group per molecule, such as compounds represented by Formulas (c-2-5), (c-2-12), and (c-2-13) below.

Monomer Mixture

The monomer mixture according to an embodiment of the present invention contains at least the compound represented by Formulas (a-1) and/or (a-2) above, the compound (2B), the compound (3B), and the compound represented by Formula (c-1). The monomer mixture according to an embodiment of the present invention may contain one type or two or more types of additional cationically polymerizable compounds in addition to the above compounds.

The monomer mixture according to an embodiment of the present invention contains, as the compound (A), the compound represented by Formulas (a-1) and/or (a-2) above, and a total content of the compound represented by Formula (a-1) above and the compound represented by Formula (a-2) above is from 1 to 20 wt. % of a total amount of the monomer mixture (total monomers included in the monomer mixture), with the lower limit of preferably 3 wt. %, particularly preferably 5 wt. %, and most preferably 7 wt. %, and with the upper limit of preferably 18 wt. % and particularly preferably 15 wt. %. The monomer mixture containing the compound represented by Formulas (a-1) and/or (a-2) above in an amount exceeding the above range is not preferred because such a mixture has a significantly reduced curing rate in the presence of moisture, and this may cause difficulty in curing. On the other hand, the monomer mixture containing the compound represented by Formulas (a-1) and/or (a-2) above in an amount below the above range is not preferred because such a mixture cannot provide fast-curing properties.

The monomer mixture according to an embodiment of the present invention contains the compound (2B) including two cationically polymerizable groups per molecule, where at least one of the cationically polymerizable groups is an epoxy group; and the compound (3B) including three or more cationically polymerizable groups per molecule, where at least one of the cationically polymerizable groups is an epoxy group; in a weight ratio of the compound (2B)/the compound (3B) ranging from 0.1 to 3.0. The lower limit of the weight ratio is preferably 0.3 and particularly preferably 0.5, and the upper limit of the weight ratio is preferably 1.8, particularly preferably 1.4, most preferably 1.2, and especially preferably 0.8. With the weight ratio exceeding the above range, a content of the compound (3B) decreases, and this tends to reduce the crosslink density of the resulting cured product and in turn reduce the hardness thereof.

The monomer mixture according to an embodiment of the present invention contains, among others, the compound (2B') including two epoxy groups per molecule and the compound (3B') including three or more epoxy groups per molecule in a weight ratio of the compound (2B')/the compound (3B') ranging from 0.1 to 3.0. The lower limit of the weight ratio is preferably 0.3 and particularly preferably 0.5, and the upper limit of the weight ratio is preferably 1.8, particularly preferably 1.4, most preferably 1.2, and especially preferably 0.8. With the weight ratio exceeding the above range, a content of the compound (3B') decreases, and this tends to reduce the crosslink density of a resulting cured product and in turn reduce the hardness thereof.

The monomer mixture according to an embodiment of the present invention preferably contains, particularly, the compound (2b) including two alicyclic epoxy groups per molecule and the compound (3b) including three or more ethylene oxide groups per molecule in a weight ratio of the compound (2b)/the compound (3b) ranging from 0.1 to 3.0. The lower limit of the weight ratio is preferably 0.3 and particularly preferably 0.5, and the upper limit of the weight ratio is preferably 1.8, particularly preferably 1.4, most preferably 1.2, and especially preferably 0.8. With the weight ratio exceeding the above range, a content of the compound (3b) decreases, and this tends to reduce the crosslink density of the resulting cured product and in turn reduce the hardness thereof.

The monomer mixture according to an embodiment of the present invention contains, among others, the compound (2b) including two alicyclic epoxy groups per molecule and the compound (3b') including three or more glycidyl ether groups per molecule in a weight ratio of the compound (2b)/the compound (3b') ranging from 0.1 to 3.0. The lower limit of the weight ratio is preferably 0.3 and particularly preferably 0.5, and the upper limit of the weight ratio is preferably 1.8, particularly preferably 1.4, most preferably 1.2, and especially preferably 0.8. With the weight ratio exceeding the above range, a content of the compound (3b') decreases, and this tends to reduce the crosslink density of the resulting cured product and in turn reduce the hardness thereof.

The monomer mixture according to an embodiment of the present invention contains, among others, the compound (2b') including two cyclohexene oxide groups per molecule and the compound (3b') including three or more glycidyl ether groups per molecule in a weight ratio of the compound (2b')/the compound (3b') ranging from 0.1 to 3.0. The lower limit of the weight ratio is preferably 0.3 and particularly preferably 0.5, and the upper limit of the weight ratio is preferably 1.8, particularly preferably 1.4, most preferably 1.2, and especially preferably 0.8. With the weight ratio exceeding the above range, a content of the compound (3b') decreases, and this tends to reduce the crosslink density of the resulting cured product and in turn reduce the hardness thereof.

The monomer mixture according to an embodiment of the present invention contains, among others, a compound (2b-1) and the compound (3b') including three or more glycidyl ether groups per molecule in a weight ratio of the compound (2b-1)/the compound (3b') ranging from 0.1 to 3.0. The lower limit of the weight ratio is preferably 0.3 and particularly preferably 0.5, and the upper limit of the weight ratio is preferably 1.8, particularly preferably 1.4, most preferably 1.2, and especially preferably 0.8. With the weight ratio exceeding the above range, a content of the compound (3b') decreases, and this tends to reduce the crosslink density of the resulting cured product and in turn reduce the hardness thereof.

A total content of the compound (2B) and the compound (3B) in an embodiment of the present invention is, for example, preferably from 10 to 50 wt. %, more preferably from 15 to 45 wt. %, particularly preferably from 20 to 40 wt. %, and most preferably more than 25 wt. % and less than 40 wt. % of the total amount of the monomer mixture.

A total content of the compound (2B') and the compound (3B') in an embodiment of the present invention is, for example, preferably from 10 to 50 wt. %, more preferably from 15 to 45 wt. %, particularly preferably from 20 to 40 wt. %, and most preferably more than 25 wt. % and less than 40 wt. % of the total amount of the monomer mixture.

A total content of the compound (2b) and the compound (3b) in an embodiment of the present invention is, for example, preferably from 10 to 50 wt. %, more preferably from 15 to 45 wt. %, particularly preferably from 20 to 40 wt. %, and most preferably more than 25 wt. % and less than 40 wt. % of the total amount of the monomer mixture.

A total content of the compound (2b) and the compound (3b') in an embodiment of the present invention is, for example, preferably from 10 to 50 wt. %, more preferably from 15 to 45 wt. %, particularly preferably from 20 to 40 wt. %, and most preferably more than 25 wt. % and less than 40 wt. % of the total amount of the monomer mixture.

A total content of the compound (2b') and the compound (3b') in an embodiment of the present invention is, for example, preferably from 10 to 50 wt. %, more preferably from 15 to 45 wt. %, particularly preferably from 20 to 40 wt. %, and most preferably more than 25 wt. % and less than 40 wt. % of the total amount of the monomer mixture.

A total content of the compound (2b-1) and the compound (3b') in an embodiment of the present invention is, for example, preferably from 10 to 50 wt. %, more preferably from 15 to 45 wt. %, particularly preferably from 20 to 40 wt. %, and most preferably more than 25 wt. % and less than 40 wt. % of the total amount of the monomer mixture.

The monomer mixture according to an embodiment of the present invention preferably contains the compound (2b-1) as the compound (2B), a content of the compound (2b-1) is, for example, preferably 20 wt. % or greater, more preferably 30 wt. % or greater, and particularly preferably 40 wt. % or greater of a total amount of the compound (B), with the upper limit of, for example, 80 wt. %, preferably 70 wt. %, and particularly preferably 65 wt. %. In addition, the content of the compound (2b-1) is preferably 5 wt. % or greater and more preferably 10 wt. % or greater of the total amount of the monomer mixture, with the upper limit of, for example, 30 wt. %, preferably 25 wt. %, and particularly preferably 18 wt. %.

The monomer mixture according to an embodiment of the present invention preferably contains, as the compound (3B), the compound (3b') including three or more glycidyl ether groups per molecule, and a content of the compound (3b') is, for example, preferably 20 wt. % or greater, more preferably 30 wt. % or greater, particularly preferably 40 wt. % or greater, and most preferably 45 wt. % or greater of the total amount of the compound (B), with the upper limit of, for example, 80 wt. %, preferably 70 wt. %, and particularly preferably 60 wt. %. In addition, the content of the compound (3b') is preferably 5 wt. % or greater, particularly preferably 10 wt. % or greater, and most preferably 15 wt. % or greater of the total amount of the monomer mixture, with the upper limit of, for example, 40 wt. %, preferably 35 wt. %, and particularly preferably 23 wt. %.

A content of the compound (C) according to an embodiment of the present invention is, for example, from 10 to 95 wt. % of the total amount of the monomer mixture, with the upper limit of preferably 80 wt. %, particularly preferably 75 wt. %, and most preferably 70 wt. %, and with the lower limit of preferably 20 wt. %, particularly preferably 30 wt. %, and most preferably 35 wt. %. The monomer mixture containing the compound (C) in an amount exceeding the above limit may cause odor generation and increase in viscosity due to volatilization (the increased viscosity may cause difficulty in printing by an inkjet method), reduce curing sensitivity, and reduce adhesion of the resulting cured product to a substrate.

A content of the compound represented by Formula (c-1) in an embodiment of the present invention is from 5 to 95 wt. % of the total amount of the monomer mixture, with the upper limit of preferably 80 wt. %, more preferably 70 wt. %, particularly preferably 60 wt. %, most preferably 50 wt. %, and especially preferably 40 wt. %, and with the lower limit of preferably 10 wt. %, particularly preferably 15 wt. %, and most preferably 25 wt. %. The monomer mixture containing the compound represented by Formula (c-1) in an amount exceeding the above limit may cause odor generation and an increase in viscosity due to volatilization (the increased viscosity may cause difficulty in printing by an inkjet method), reduce curing sensitivity, and reduce adhesion of the resulting cured product to a substrate.

A content of the compound including, as cationically polymerizable groups, two or more oxetanyl groups per molecule, including the compound represented by Formula (c-1), in an embodiment of the present invention is, for example, from 10 to 95 wt. % of the total amount of the monomer mixture, with the upper limit of preferably 80 wt. %, more preferably 70 wt. %, particularly preferably 60 wt. %, most preferably 50 wt. %, and especially preferably 40 wt. %, and with the lower limit of preferably 15 wt. %, particularly preferably 20 wt. %, and most preferably 25 wt. %. The monomer mixture containing the compound including, as cationically polymerizable groups, two or more oxetanyl groups per molecule in an amount exceeding the above limit may cause odor generation and an increase in viscosity due to volatilization (the increased viscosity may cause difficulty in printing by an inkjet method), reduce curing sensitivity, and reduce adhesion of the resulting cured product to a substrate.

A content of the compound including, as a cationically polymerizable group, only one oxetanyl group per molecule and having a viscosity of 10 mPa·s or less at 25° C. in an embodiment of the present invention is, for example, preferably 30 wt. % or less, more preferably 25 wt. % or less, and particularly preferably 15 wt. % or less of the total amount of the monomer mixture in terms of being able to prevent odor generation and an increase in viscosity due to volatilization (the increased viscosity may cause difficulty in printing by an inkjet method), a reduction in curing sensitivity, and a reduction in adhesion of the resulting cured product to a substrate.

A content of the compound including, as a cationically polymerizable group, only one oxetanyl group per molecule and having a viscosity of 10 mPa·s or less at 25° C. and a boiling point of, for example, 80° C. or higher under normal pressure in an embodiment of the present invention is, for example, preferably 30 wt. % or less, more preferably 25 wt. % or less, and particularly preferably 15 wt. % or less of the total amount of the monomer mixture in terms of being able to prevent odor generation and an increase in viscosity due to volatilization (the increased viscosity may cause difficulty in printing by an inkjet method), a reduction in curing sensitivity, and a reduction in adhesion of the resulting cured product to a substrate.

A total content of the compound represented by Formula (a-1), the compound represented by Formula (a-2), the compound (2B), the compound (3B), and the compound represented by Formula (c-1) in an embodiment of the present invention is, for example, preferably 45 wt. % or greater, more preferably 50 wt. % or greater, particularly preferably 65 wt. % or greater, and most preferably 70 wt. % or greater of the total amount of the monomer mixture, with the upper limit of, for example, 98 wt. %, preferably 90 wt. %, particularly preferably 85 wt. %, and most preferably 80 wt. %.

A total content of the compound represented by Formula (a-1), the compound represented by Formula (a-2), the compound (2B'), the compound (3B'), and the compound represented by Formula (c-1) in an embodiment of the present invention is, for example, preferably 45 wt. % or greater, more preferably 50 wt. % or greater, particularly preferably 65 wt. % or greater, and most preferably 70 wt. % or greater of the total amount of the monomer mixture, with the upper limit of, for example, 98 wt. %, preferably 90 wt. %, particularly preferably 85 wt. %, and most preferably 80 wt. %.

A total content of the compound represented by Formula (a-1), the compound represented by Formula (a-2), the compound (2b), the compound (3b), and the compound represented by Formula (c-1) in an embodiment of the present invention is, for example, preferably 45 wt. % or greater, more preferably 50 wt. % or greater, particularly preferably 65 wt. % or greater, and most preferably 70 wt. % or greater of the total amount of the monomer mixture, with the upper limit of, for example, 98 wt. %, preferably 90 wt. %, particularly preferably 85 wt. %, and most preferably 80 wt. %.

A total content of the compound represented by Formula (a-1), the compound represented by Formula (a-2), the compound (2b), the compound (3b'), and the compound represented by Formula (c-1) in an embodiment of the present invention is, for example, preferably 45 wt. % or greater, more preferably 50 wt. % or greater, particularly preferably 65 wt. % or greater, and most preferably 70 wt. % or greater of the total amount of the monomer mixture, with the upper limit of, for example, 98 wt. %, preferably 90 wt. %, particularly preferably 85 wt. %, and most preferably 80 wt. %.

A total content of the compound represented by Formula (a-1), the compound represented by Formula (a-2), the compound (2b'), the compound (3b'), and the compound represented by Formula (c-1) in an embodiment of the present invention is, for example, preferably 45 wt. % or greater, more preferably 50 wt. % or greater, particularly preferably 65 wt. % or greater, and most preferably 70 wt. % or greater of the total amount of the monomer mixture, with the upper limit of, for example, 98 wt. %, preferably 90 wt. %, particularly preferably 85 wt. %, and most preferably 80 wt. %.

A total content of the compound represented by Formula (a-1), the compound represented by Formula (a-2), the compound (2b-1), the compound (3b'), and the compound represented by Formula (c-1) in an embodiment of the present invention is, for example, preferably 45 wt. % or greater, more preferably 50 wt. % or greater, particularly preferably 65 wt. % or greater, and most preferably 70 wt.

% or greater of the total amount of the monomer mixture, with the upper limit of, for example, 98 wt. %, preferably 90 wt. %, particularly preferably 85 wt. %, and most preferably 80 wt. %.

A total content of a compound including only one cationically polymerizable group selected from a vinyl ether group, an epoxy group, and an oxetanyl group per molecule (i.e., a monofunctional monomer) in an embodiment of the present invention is, for example, 30 wt. % or less of the total amount of the monomer mixture in terms of achieving excellent curability, particularly preferably 25 wt. % or less, most preferably 20 wt. % or less, and especially preferably 15 wt. % or less of the total amount of the monomer mixture. In addition, in terms of achieving excellent curability, low viscosity and thus excellent coatability, the total content is, for example, preferably 3 wt. % or greater, more preferably 5 wt. % or greater, most preferably 8 wt. % or greater, and especially preferably 10 wt. % or greater. The monomer mixture containing the monofunctional monomer in an amount exceeding the above range tends to have difficulty in providing a cured product having high hardness.

A total content of a compound including two cationically polymerizable groups selected from a vinyl ether group, an epoxy group, and an oxetanyl group per molecule in an embodiment of the present invention is, for example, preferably 30 wt. % or greater, more preferably 40 wt. % or greater, particularly preferably 50 wt. % or greater, and most preferably 55 wt. % or greater of the total amount of the monomer mixture, with the upper limit of, for example, 95 wt. %, preferably 90 wt. %, particularly preferably 85 wt. %, and most preferably 80 wt. %.

A total content of a compound including three cationically polymerizable groups selected from a vinyl ether group, an epoxy group, and an oxetanyl group per molecule in an embodiment of the present invention is, for example, preferably 5 wt. % or greater, more preferably 10 wt. % or greater, and particularly preferably 15 wt. % or greater of the total amount of the monomer mixture, with the upper limit of, for example, 30 wt. %. The monomer mixture containing the compound in an amount below the above range tends to reduce the crosslink density of the resulting cured product and in turn reduce the hardness thereof.

The monomer mixture according to an embodiment of the present invention may contain an additional monomer in addition to the above compounds, but a content of the additional monomer is, for example, preferably 30 wt. % or less, more preferably 20 wt. % or less, particularly preferably 10 wt. % or less, most preferably 5 wt. % or less, and especially preferably 1 wt. % or less of the total amount of the monomer mixture.

The monomer mixture according to an embodiment of the present invention can be produced by uniformly mixing the compound represented by Formulas (a-1) and/or (a-2) above, the compound (2B), the compound (3B), the compound represented by Formula (c-1), and as necessary an additional monomer, using a commonly known mixing equipment, such as a self-rotating stirring defoaming device, a homogenizer, a planetary mixer, a three-roll mill, and a bead mill. Here, each component may be mixed at the same time or sequentially.

The monomer mixture including the above composition can form a curable composition by adding a curing catalyst thereto. The curable composition obtained by using the monomer mixture including the above composition can be rapidly cured by ultraviolet irradiation even in the presence of oxygen or moisture to form a cured product having high hardness, excellent alkali resistance, and excellent adhesion to a wide range of substrates.

Curable Composition

The curable composition according to an embodiment of the present invention contains the monomer mixture and a curing catalyst.

A content of the monomer mixture is, for example, from approximately 50 to 99.9 wt. %, and preferably from 70 to 98 wt. % of the total amount (100 wt. %) of the curable composition according to an embodiment of the present invention.

The curing catalyst includes a well-known or commonly used photocationic polymerization initiator and a photoradical polymerization initiator. The curable composition according to an embodiment of the present invention preferably contains at least a photocationic polymerization initiator as a curing catalyst and preferably contains particularly both a photocationic polymerization initiator and a photoradical polymerization initiator in terms of enabling the curing reaction of the curable composition to further efficiently proceed and providing a cured product having especially high hardness.

Examples of the photocationic polymerization initiator include diazonium salt compounds, iodonium salt compounds, sulfonium salt compounds, phosphonium salt compounds, selenium salt compounds, oxonium salt compounds, ammonium salt compounds, and bromine salt compounds. In an embodiment of the present invention, a commercially available product can be preferably used, for example, such as those under the trade names "CPI-101A", "CPI-100P", and "CPI-110P" (the above available from San-Apro Ltd.), the trade names "CYRACURE UVI-6990" and "CYRACURE UVI-6992" (the above available from Dow Chemical Co., Ltd.), the trade name "UVACURE 1590" (available from Daicel-Allnex Ltd.), the trade names "CD-1010", "CD-1011", and "CD-1012" (the above available from Sartomer USA), the trade name "Irgacure-264" (available from BASF), the trade name "CIT-1682" (available from Nippon Soda Co., Ltd.), and the trade name "PHOTOINITIATOR 2074" (available from Rhodia Japan Ltd.). One type alone or two or more types thereof in combination can be used.

Examples of the photoradical polymerization initiator include 1-hydroxycyclohexyl phenyl ketone, 2-hydroxy-2-methyl-1-phenylpropan-1-one, diethoxyacetophenone, 1-(4-isopropylphenyl)-2-hydroxy-2-methylpropan-1-one, 1-(4-dodecylphenyl)-2-hydroxy-2-methylpropan-1-one, 4-(2-hydroxyethoxy)-phenyl(2-hydroxy-2-propyl)ketone, 2-methyl-1-[4-(methylthio)phenyl]-2-morpholinopropan-1-one, benzoin, benzoin methyl ether, benzoin ethyl ether, benzoin isopropyl ether, benzoin-n-butyl ether, benzoin phenyl ether, benzyl dimethyl ketal, benzophenone, benzoylbenzoic acid, methyl benzoylbenzoate, 4-phenylbenzophenone-4-methoxybenzophenone, thioxanthone, 2-chlorothioxanthone, 2-methylthioxanthone, 2,4-dimethylthioxanthone, isopropylthioxanthone, 2,4-dichlorothioxanthone, 2,4-diethylthioxanthone, 2,4-diisopropylthioxanthone, 2,4,6-trimethylbenzoyldiphenylphosphine oxide, methyl phenylglyoxylate, benzyl, and camphorquinone. In an embodiment of the present invention, a commercially available product can be preferably used, for example, such as those under the trade names "Irgacure-184", "Irgacure-127", "Irgacure-149", "Irgacure-261", "Irgacure-369", "Irgacure-500", "Irgacure-651", "Irgacure-754", "Irgacure-784", "Irgacure-819", "Irgacure-907", "Irgacure-1116", "Irgacure-1173", "Irgacure-1664", "Irgacure-1700", "Irgacure-1800", "Irgacure-1850", "Irgacure-2959", "Irgacure- 4043", "Darocur-1173", and "Darocur-MBF" (available from BASF). One type alone or two or more types thereof in combination can be used.

The photocationic polymerization initiator is used in an amount, for example, preferably from approximately 0.1 to 10 parts by weight, more preferably from 0.5 to 10 parts by weight, particularly preferably from 1 to 8 parts by weight, and most preferably from 3 to 8 parts by weight relative to 100 parts by weight of the monomer mixture.

In addition, in the case where the photoradical polymerization initiator is used together with the photocationic polymerization initiator as curing catalysts, the photoradical polymerization initiator is used in an amount preferably from 0.1 to 5 parts by weight, particularly preferably from 0.5 to 3 parts by weight, and most preferably from 0.5 to 2 parts by weight relative to 100 parts by weight of the monomer mixture.

The curable composition according to an embodiment of the present invention may contain an additional component as necessary in addition to the monomer mixture and the curing catalyst. Examples of the additional component include well-known and commonly used sensitizers (for example, such as acridine compounds, benzoflavins, perylenes, anthracenes, thioxanthone compounds, and laser pigments), sensitization auxiliary agents, antioxidants, and stabilizers, such as amines. In particular, in the case where the curable composition according to an embodiment of the present invention is used in applications for curing by UV-LED irradiation, the curable composition preferably contains a sensitizer and, as necessary, a sensitization auxiliary agent in terms of improving the light absorbance of the curing catalyst to improve the curability. A content thereof (total amount when two or more types are contained) is, for example, from approximately 0.05 to 10 parts by weight and preferably from 0.1 to 5 parts by weight relative to 100 parts by weight of the monomer mixture. Furthermore, the curable composition according to an embodiment of the present invention may or may not contain a solvent. Whether the solvent should be contained can be appropriately adjusted according to the coating conditions and the like.

In addition, the curable composition preferably contains, as sensitizers, a compound represented by Formula (d-1) below and a compound represented by Formula (d-2) below in combination in terms of being able to improve curability of the resulting cured product while reducing coloration thereof to an extremely low level. A ratio of these compounds combined [the compound represented by Formula (d-1)/the compound represented by Formula (d-2); weight ratio] is, for example, from 0.1 to 1.0, preferably from 0.1 to 0.5, and particularly preferably from 0.2 to 0.5. In addition, as the compound represented by Formula (d-1) below, for example, the trade name "Anthracure UVS-1331" (available from Kawasaki Kasei Chemicals Ltd.) can be used. Furthermore, as the compound represented by Formula (d-2) below, for example, the trade name "Anthracure UVS-581" (available from Kawasaki Kasei Chemicals Ltd.) can be used.

[Chem. 13]

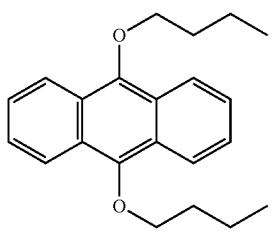

(d-1)

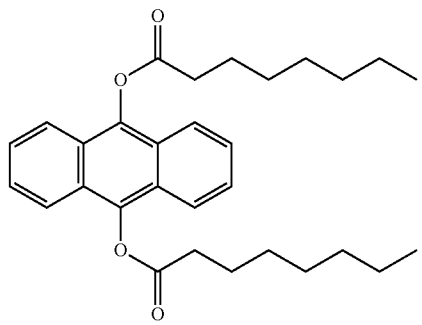

(d-2)

In the case where the curable composition according to an embodiment of the present invention is used as a color ink for an ultraviolet-curable inkjet ink, the curable composition preferably further contains a coloring material. The coloring material include a pigment and a dye. On the other hand, the curable composition containing no coloring material can be suitably used as a clear ink.

Pigment

As the pigment, a coloring material that is commonly known as a pigment and dispersible in the curable composition can be used without particular limitation. The average particle diameter of the pigment is, for example, preferably 300 nm or less from the viewpoint of achieving excellent discharging characteristics, jetting characteristics of ink, and printing reproducibility. One type alone or two or more types of the pigments in combination can be used.

The pigment may have magnetism, fluorescence, electrical conductivity, dielectric property, or the like in addition to color development and coloration.

Examples of the pigment that can be used include inorganic pigments, such as earth pigments (for example, such as ocher and umber), lapis lazuli, azulite, chalk, whitewash, white lead, vermilion, ultramarine, viridian, cadmium red, carbon pigments (for example, such as carbon black, carbon refined, and carbon nanotubes), metal oxide pigments (for example, such as iron black, cobalt blue, zinc oxide, titanium oxide, chromium oxide, and iron oxide), metal sulfide pigments (for example, such as zinc sulfide), metal sulfates, metal carbonates (for example, such as calcium carbonate and magnesium carbonate), metal silicates, metal phosphates, and metal powders (for example, such as aluminum powder, bronze powder, and zinc powder); organic pigments, such as insoluble azo pigments (for example, such as monoazo yellow, monoazo red, monoazo violet, disazo yellow, disazo orange, and pyrazolone pigments), soluble azo pigments (for example, such as azo yellow lake and azo lake red), benzimidazolone pigments, β-naphthol pigments, naphthol AS pigments, condensed azo pigments, quinacridone pigments (for example, such as quinacridone red and quinacridone magenta), perylene pigments (for example, such as perylene red and perylene scarlet), perinone pigments (for example, such as perinone orange), isoindolinone pigments (for example, such as isoindolinone yellow and isoindolinone orange), isoindoline pigments (for example, such as isoindoline yellow), dioxazine pigments (for example, such as dioxazine violet), thioindigo pigments, anthraquinone pigments, quinophthalone pigments (for example, such as quinophthalone yellow), metal complex pigments, diketopyrrolopyrrole pigments, phthalocyanine pigments (for example, such as phthalocyanine blue and phthalocyanine green), and dye lake pigments; and fluorescent pigments, such as inorganic phosphors and organic phosphors.

Dye

Examples of the dye include nitroaniline dyes, phenyl monoazo dyes, pyridone azo dyes, quinophthalone dyes, styryl dyes, anthraquinone dyes, naphthalimide azo dyes, benzothiazolyl azo dyes, phenyl disazo dyes, and thiazolyl azo dyes.

A content of the coloring material (total amount when two or more types are contained) is, for example, from approximately 0.5 to 20 parts by weight and preferably from 1 to 15 parts by weight relative to 100 parts by weight of the monomer mixture.

Furthermore, in the case where the curable composition according to an embodiment of the present invention is used as an ultraviolet-curable inkjet ink, the curable composition preferably contains a dispersant to improve the dispersibility of the coloring material. Examples of the dispersant include nonionic surfactants, ionic surfactants, charging agents, and polymeric dispersants (for example, the trade names "Solsperse 24000" and "Solsperse 32000", the above available from Avecia Inc.; "Adisper PB821", "Adisper PB822", "Adisper PB824", "Adisper PB881", "Adisper PN411", and "Adisper PN411", the above available from Ajinomoto Fine-Techno Co. Inc). One type alone or two or more types thereof in combination can be used.

A content of the dispersant is, for example, from approximately 1 to 50 parts by weight, preferably from 3 to 30 parts by weight, and particularly preferably from 5 to 10 parts by weight relative to 100 parts by weight of the coloring material.

The surface tension (at 25° C. under 1 atm) of the curable composition according to an embodiment of the present invention is, for example, from approximately 10 to 50 mN/m, preferably from 15 to 40 mN/m, particularly preferably from 15 to 30 mN/m, and most preferably from 18 to 30 mN/m. Here, the surface tension of the composition can be measured by Wilhelmy method (plate method), for example, using a high-precision surface tension meter "DY-700" (available from Kyowa Interface Science Co., LTD.).

The viscosity of the curable composition according to an embodiment of the present invention [at 25° C. and shear rate of 100 (1/s)] is, for example, from approximately 1 to 1000 mPa·s, with the upper limit of preferably 400 mPa·s, more preferably 100 mPa·s, particularly preferably 50 mPa·s, most preferably 30 mPa·s, and especially preferably 20 mPa·s, and with the lower limit of preferably 3 mPa·s, particularly preferably 5 mPa·s, and most preferably 10 mPa·s. Thus, the curable composition according to an embodiment of the present invention has excellent fluidity, and when discharged (or ejected) using, for example, an inkjet type printer, exhibits excellent dischargeabiliy.

In addition, the curable composition according to an embodiment of the present invention can be rapidly cured by ultraviolet irradiation even in the presence of oxygen or moisture to form a cured product. Thus, when used as an ultraviolet-curable inkjet ink, the curable composition can prevent generation of bleed and an odor, and can form an ink coating having excellent print quality.

Ultraviolet light sources, for example, such as a UV-LED; a mercury lamp, such as a low-, medium-, and high-pressure mercury lamps; a mercury-xenon lamp; a metal halide lamp; a tungsten lamp; an arc lamp; an excimer lamp; an excimer laser; a semiconductor laser; a YAG laser; a laser system combining a laser and a non-linear optical crystal; and a high-frequency induced ultraviolet light generating device; can be used. The ultraviolet irradiation dose (integrated light quantity) is, for example, from approximately 10 to 5000 mJ/cm$^2$.

The curable composition according to an embodiment of the present invention may be further subjected to heat treatment after irradiation with ultraviolet light. The heat treatment can further improve the degree of cure. When heat treatment is performed, the heating temperature is from approximately 40 to 200° C., and the heating time is from approximately 1 minute to 15 hours. In addition, the degree of cure can also be improved by allowing the composition to stand at room temperature (20° C.) for approximately 1 to 48 hours after the ultraviolet irradiation.

The curable composition according to an embodiment of the present invention can form a cured product having excellent adhesion to a wide range of substrates [for example, such as glass, metal (for example, such as aluminum foil and copper foil), plastics (for example, such as polyethylene, polypropylene, polyethylene terephthalate (PET), a vinyl chloride resin, polycarbonate, and an ABS resin), natural rubber, butyl rubber, foam (for example, such as polyurethane and polychloroprene rubber), wood, woven fabric, nonwoven fabric, cloth, paper (for example, such as high-quality paper, glassine paper, kraft paper, and Japanese paper), silicon wafers, ceramics, and composites thereof]. In addition, the substrate may be treated on the surface thereof with a well-known surface treatment (such as ozone treatment, plasma treatment, and corona treatment).

In addition, the curable composition according to an embodiment of the present invention can form a cured product having not only excellent acid resistance and resistance to neutral substance, but also excellent alkali resistance, a molded article thereof, and a structure including the cured product.

Here, in the present specification, alkali resistance refers to resistance (for example, dissolution resistance) in conditions where an alkaline substance (for example, at least one selected from sodium hydroxide, sodium carbonate, sodium bicarbonate, sodium hypochlorite, 2-aminoethanol, and Lewis bases, such as pyridine; and the like) is present (pH is, for example, from 8 to 14), and acid resistance refers to resistance (for example, dissolution resistance) in conditions where an acidic substance (for example, at least one selected from hydrochloric acid, sulfuric acid, nitric acid, phosphoric acid, acetic acid, citric acid, and Lewis acids, such as aluminum chloride) is present (pH is, for example, from 1 to 6).

Furthermore, the curable composition according to an embodiment of the present invention can form a cured product having high hardness (pencil hardness (in accordance with JIS K5600-5-4) is, for example, 3B or greater).

Thus, the curable composition according to an embodiment of the present invention can be suitably used as an ultraviolet-curable inkjet ink material; an adhesive agent; a sealing material; a civil engineering and construction material; an electric and electronic part, such as a laminated plate; a photoresist; a solder resist; an interlayer component for a multilayer wiring board; an insulating material; a repair material for a concrete structure; a cast material; a sealant; a stereolithography material; and an optical material, such as a lens and an optical waveguide.

The curable composition according to an embodiment of the present invention, when used as an ultraviolet-curable inkjet ink, can form a very high precision ink coating in air atmosphere without particularly limiting humidity conditions and objects to be printed, and without odor generation. In addition, the ink coating can be rapidly cured by ultraviolet irradiation to form a cured product having high hardness and excellent adhesion to a wide range of substrates, which do not dissolve or cause white cloudiness even if wiped with an alkaline chemical. That is, the curable composition according to an embodiment of the present invention, when used as an ultraviolet-curable inkjet ink, can form a print having high hardness with good precision, and the print is not erased or does not cause white cloudiness even if wiped with an alkaline chemical.

Molded Article and Production Method Thereof

The molded article according to an embodiment of the present invention includes a cured product of the curable composition. The molded article according to an embodiment of the present invention can be produced by discharging the curable composition by an inkjet method, and then curing the discharged curable composition.

A three-dimensional molded article may be produced by subjecting a cured product of the curable composition to cutting or the like, may be produced by molding the curable composition, or, furthermore, may be produced using a three-dimensional printer by an inkjet method or the like.

The shape and thickness of the molded article can be appropriately adjusted according to the application.

The curable composition has fast-curing properties, and thus when used in formation of a molded article (for example, a three-dimensional molded article), the curable composition can easily and efficiently produce a molded article having a desired shape.

The molded article according to an embodiment of the present invention includes a cured product of the curable composition, and thus the molded article has not only excellent acid resistance and resistance to neutral substance, but also has excellent alkali resistance. In addition, the molded article has high hardness (pencil hardness (in accordance with JIS K5600-5-4) is, for example, B or greater), and is not easily scratched (namely, having excellent scratch resistance).

Structure and Production Method Thereof

The structure according to an embodiment of the present invention has a configuration including a cured product of the curable composition on a surface of a substrate. The structure can be produced, for example, by discharging the curable composition onto the surface of the substrate by an inkjet method, and then curing the discharged curable composition.

The substrate is not particularly limited, and the substrate described above can be used. The structure according to an embodiment of the present invention is formed using the curable composition, and thus the substrate and the cured product have excellent adhesion.

The shape and thickness of the cured product can be appropriately adjusted according to the application.

The curable composition has fast-curing properties, and thus the curable composition can efficiently produce the structure (for example, a structure including a print or a coating film including a cured product of the curable composition on a surface of a substrate). In addition, the cured product of the curable composition has high hardness (pencil hardness (in accordance with JIS K5600-5-4) is, for example, B or greater), and thus the structure according to an embodiment of the present invention has a surface of the cured product that is not easily scratched (namely, having excellent scratch resistance). Furthermore, the cured product of the curable composition has excellent alkali resistance, and thus, when the structure according to an embodiment of the present invention is, for example, a structure including a print including the cured product of the curable composition on a surface of a substrate, the print has such a property that it is not easily erased even if wiped with an alkaline chemical or the like.

EXAMPLES

Hereinafter, the present invention will be described more specifically with reference to examples, but the present invention is not limited by these examples.

Example 1

The components were mixed in accordance with the formulation described in Table 1 (in parts by weight) to obtain an ink (1). The viscosity of the resulting ink at 25° C. and a shear rate of 100 (1/s) as measured using an E-type viscometer (trade name "VISCOMETER TV-25", available from Toki Sangyo Co., Ltd.) was 20 mPa·s.

Examples 2 to 17, Comparative Examples 1 to 3

Inks were obtained in the same manner as in Example 1 except for changing the formulations as described in Tables 1 and 2 (in parts by weight). In addition, in Examples 13 to 17, the components were mixed and then filtered using an 1-μm PTFE filter.

Evaluation of Curability in Presence of Moisture

The ink obtained in Examples or Comparative Examples was a water-free ink.

In addition, 5 parts by weight of water was added to 100 parts by weight of the ink obtained in Examples or Comparative Examples and stirred to prepare a water-containing ink.

The water-free ink or the water-containing ink was coated to a glass plate (coating thickness: 5 μm) and irradiated with 365 nm light using an LED irradiator in air atmosphere to measure an integrated light quantity (mJ/cm$^2$) until the tackiness was eliminated (specifically, until the coated surface, when rubbed with a Kimwipe (trademark), became in a state of being not sticky or not peeled off from the glass plate), and an increase rate of the integrated light quantity due to the addition of water was calculated from the formula described below to evaluate the curability according to the criteria described below.

Increase rate (%) of integrated light quantity={(integrated light quantity required to cure water-containing ink/integrated light quantity required to cure water–free ink)–1}×100

Evaluation Criteria for Curability in Presence of Water

Increase rate of integrated light quantity was 20% or greater: poor curability (Poor)

Increase rate of integrated light quantity was less than 20%: good curability (Good)

Evaluation of Hardness

The ink obtained in Examples or Comparative Examples was coated onto an ABS substrate (trade name "Hishiplate 296", available from Mitsubishi Plastics, Inc.) to a thickness of about 10 μm using a bar coater and irradiated with 365 nm light using an LED irradiator until tackiness was eliminated to cure and to obtain a cured product/ABS substrate laminate. The resulting laminate was further heat treated using an oven at a temperature of 80° C. for 30 minutes. This laminate was used as a sample.

The pencil hardness of the cured product side surface of the sample was measured by a method in accordance with JIS K5600-5-4 (ISO/DIN15184).

Evaluation of Chemical Resistance

A sample was obtained in the same manner as in the evaluation of hardness.

The resulting sample was immersed in the following neutral, acidic, or alkaline chemicals for 7 days, and the appearance change was visually observed during 7 days after starting the immersion to evaluate the chemical resistance according to the criteria described below.

Neutral chemical: pure water+1 wt. % of N,N-dimethyldodecylamine N-oxide

Acidic chemical: 9.5% aqueous hydrochloric acid solution (pH=1)+1 wt. % of N,N-dimethyldodecylamine N-oxide Alkaline chemical: 4% sodium hypochlorite+1% NaOH-containing aqueous solution (pH=13)+1 wt. % of N,N-dimethyldodecylamine N-oxide Evaluation Criteria for Chemical Resistance The cured product portion of the sample had no white cloudiness or did not dissolve for 7 days after starting the immersion: especially good chemical resistance (Excellent)

The cured product portion of the sample had white cloudiness but did not dissolve from day 4 to day 6 after starting the immersion: good chemical resistance (Good)

The cured product portion of the sample had white cloudiness but did not dissolve by day 3 after starting the immersion: slightly poor chemical resistance (Marginal)

At least a portion of the cured product portion of the sample was dissolved: poor chemical resistance (Poor)

Evaluation of Adhesion

In the evaluation of chemical resistance, a sample of which the cured product portion did not dissolve was subjected to an adhesion test (cross-cut method; in accordance with JIS K5600-5-6 (ISO2409)) to evaluate the adhesion from the number of sections, out of 25 sections, that included cured product remained on the ABS substrate without peeling off.

The results are summarized and shown in the table below.

TABLE 1

| | | Example 1 | Example 2 | Example 3 | Example 4 | Example 5 | Example 6 | Example 7 | Example 8 |
|---|---|---|---|---|---|---|---|---|---|
| Monomer mixture | ISBDVE | 10 | 10 | 10 | 10 | 10 | 10 | 10 | 10 |
| | HEVE | 10 | 5 | 10 | 5 | 5 | 5 | 5 | 5 |
| | Celloxide 2021P | 15 | 15 | 20 | 20 | 15 | 15 | 15 | 15 |
| | YH300 | 20 | 25 | 10 | 20 | 10 | 10 | 10 | 25 |
| | 2B/3B | 0.75 | 0.6 | 2 | 1 | 1.5 | 1.5 | 1.5 | 0.6 |
| | OXT101 | — | — | — | — | — | — | — | — |
| | OXT121 | — | — | 15 | — | 15 | 15 | 30 | 15 |
| | OXT221 | 30 | 30 | 20 | 30 | 30 | 45 | 30 | 30 |
| | OXT212 | 15 | — | — | — | — | — | — | — |
| | ALOX | — | 15 | 15 | 15 | 15 | — | — | — |
| Photocationic polymerization initiator | CPI-110P | 5 | 5 | 5 | 5 | 5 | 5 | 5 | 5 |
| Photoradical polymerization initiator | Irg184 | 1 | — | — | — | — | — | — | — |
| Sensitizer | UVS1331 | 0.3 | 1.5 | 1.5 | 1.5 | 1.5 | 1.5 | 1.5 | 1.5 |
| | UVS581 | 1 | — | — | — | — | — | — | — |
| Dispersant | | — | — | — | — | — | — | — | — |
| Viscosity (mPs · s) | | 20 | 23 | 25 | 23 | 17.03 | 38.18 | 54.14 | 56.49 |
| Curability in presence of water | | Good | Good | Good | Good | Good | Good | Good | Good |
| Hardness | | 2 B | 2 B | 2 B | 2 B | 3 B | 2 B | 2 B | B |
| Chemical resistance | Resistance to neutral substance | Excellent | Excellent | Excellent | Excellent | Excellent | Excellent | Excellent | Excellent |
| | Acid resistance | Excellent | Excellent | Excellent | Excellent | Excellent | Excellent | Excellent | Excellent |
| | Alkali resistance | Excellent | Good | Marginal | Marginal | Excellent | Excellent | Excellent | Excellent |
| Adhesion to substrate | Neutral | 25/25 | 25/25 | 25/25 | 25/25 | 25/25 | 25/25 | 25/25 | 25/25 |
| | Acidic | 25/25 | 25/25 | 25/25 | 25/25 | 25/25 | 25/25 | 25/25 | 25/25 |
| | Alkaline | 25/25 | 25/25 | 25/25 | 25/25 | 25/25 | 25/25 | 25/25 | 25/25 |
| Overall evaluation | | Excellent | Good | Marginal | Marginal | Good | Excellent | Good | Good |

| | | Example 9 | Example 10 | Example 11 | Example 12 | Comparative Example 1 | Comparative Example 2 | Comparative Example 3 |
|---|---|---|---|---|---|---|---|---|
| Monomer mixture | ISBDVE | 10 | 10 | 10 | 10 | 10 | 25 | 50 |
| | HEVE | 5 | 5 | 10 | 10 | 5 | — | — |
| | Celloxide 2021P | 15 | 15 | 15 | 15 | 15 | 25 | 20 |
| | YH300 | 20 | 25 | 20 | 25 | 10 | — | — |
| | 2B/3B | 0.75 | 0.6 | 0.75 | 0.6 | 1.5 | 0 | 0 |
| | OXT101 | — | — | — | — | 10 | — | — |
| | OXT121 | 20 | — | — | — | 35 | — | — |
| | OXT221 | 30 | 30 | 30 | 30 | — | — | — |
| | OXT212 | — | 15 | 15 | 10 | — | 50 | 30 |
| | ALOX | — | — | — | — | 15 | — | — |

TABLE 1-continued

| | | | | | | | | |
|---|---|---|---|---|---|---|---|---|
| Photocationic polymerization initiator | CPI-110P | 5 | 5 | 5 | 5 | 5 | 5 | 5 |
| Photoradical polymerization initiator | Irg184 | — | — | 1 | — | — | — | — |
| Sensitizer | UVS1331 | 1.5 | 1.5 | 1.5 | 1.5 | 1.5 | — | — |
| | UVS581 | — | — | 1 | — | — | — | — |
| Dispersant | | — | — | — | — | — | — | — |
| Viscosity (mPs·s) | | 56.1 | 30.93 | 22.4 | 26.9 | 50 | — | — |
| Curability in presence of water | Resistance to neutral substance | Good | Good | Good | Good | Good | Good | Poor |
| Hardness | Acid resistance | 2B | 3B | 3B | 3B | 3B | — | — |
| Chemical resistance | Alkali resistance | Excellent | Excellent | Excellent | Excellent | Excellent | Excellent | — |
| | | Excellent | Excellent | Excellent | Excellent | Excellent | Excellent | — |
| | | Excellent | Excellent | Excellent | Excellent | Poor | Poor | — |
| Adhesion to substrate | Neutral | 25/25 | 25/25 | 25/25 | 25/25 | 25/25 | 25/25 | — |
| | | 25/25 | 25/25 | 25/25 | 25/25 | 25/25 | 25/25 | — |
| | | 25/25 | 25/25 | 25/25 | 25/25 | — | — | — |
| Overall evaluation | | Good | Good | Good | Good | Poor | Poor | Poor |

TABLE 2

| | | Example 13 | Example 14 | Example 15 | Example 16 | Example 17 |
|---|---|---|---|---|---|---|
| Monomer mixture | ISBDVE | 10 | 10 | 10 | 10 | 10 |
| | HEVE | 10 | 10 | 10 | 10 | 10 |
| | Celloxide 2021P | 15 | 15 | 15 | 15 | 15 |
| | YH300 | 20 | 20 | 20 | 20 | 20 |
| | 2B/3B | 0.75 | 0.75 | 0.75 | 0.75 | 0.75 |
| | OXT101 | — | — | — | — | — |
| | OXT121 | — | — | — | — | — |
| | OXT221 | 30 | 30 | 30 | 30 | 30 |
| | OXT212 | 15 | 15 | 15 | 15 | 15 |
| | ALOX | — | — | — | — | — |
| Photocationic polymerization initiator | CPI-110P | 5 | 5 | 5 | 5 | 5 |
| Photoradical polymerization initiator | Irg184 | 1 | 1 | 1 | 1 | 1 |
| Sensitizer | UVS1331 | 0.3 | 0.3 | 0.3 | 0.3 | 0.3 |
| | UVS581 | 1 | 1 | 1 | 1 | 1 |
| Coloring material | Pigment Blue 154 | 2.5 | — | — | — | — |
| | Pigment Red 122 | — | 2.5 | — | — | — |
| | Pigment Yellow 155 | — | — | 2.5 | — | — |
| | Pigment Black 7 | — | — | — | 2.5 | — |
| | Pigment White 6 | — | — | — | — | 10 |
| Dispersant | | 1.5 | 1.5 | 1.5 | 1.5 | 6 |
| Viscosity (mPs·s) | | 22.1 | 23.3 | 21.2 | 22.2 | 22.4 |
| Curability in presence of water | | Good | Good | Good | Good | Good |
| Hardness | | 2B | 2B | 2B | 2B | 3B |
| Chemical resistance | Resistance to neutral substance | Excellent | Excellent | Excellent | Excellent | Excellent |
| | Acid resistance | Excellent | Excellent | Excellent | Excellent | Excellent |
| | Alkali resistance | Excellent | Excellent | Excellent | Excellent | Excellent |
| Adhesion to substrate | Neutral | 25/25 | 25/25 | 25/25 | 25/25 | 25/25 |
| | Acidic | 25/25 | 25/25 | 25/25 | 25/25 | 25/25 |
| | Alkaline | 25/25 | 25/25 | 25/25 | 25/25 | 25/25 |
| Overall evaluation | | Excellent | Excellent | Excellent | Excellent | Excellent |

Abbreviations in the tables are described below.

Vinyl Ether Compounds

ISBDVE: isosorbide divinyl ether, trade name "ISBDVE", available from Daicel Corporation HEVE: ethylene glycol monovinyl ether Epoxy Compounds Celloxide 2021P: 3,4-epoxycyclohexylmethyl(3,4-epoxy)cyclohexanecarboxylate, trade name "Celloxide 2021P", available from Daicel Corporation YH300: trimethylolpropane triglycidyl ether Oxetane Compounds OXT101: 3-ethyl-3-hydroxymethyl oxetane, boiling point 105° C./0.93 kPa, viscosity at 25° C.: from 17 to 22 mPa·s, trade name "Aron oxetane OXT-101", available from Toagosei Co., Ltd.

OXT121: 1,4-bis[(3-ethyl-3-oxetanylmethoxy)methyl]benzene, solid at 25° C., trade name: "Aron oxetane OXT-121", available from Toagosei Co., Ltd.

OXT221: bis[1-ethyl(3-oxetanyl)]methyl ether, trade name "Aron oxetane OXT-221", boiling point 119° C./0.67 kPa, viscosity at 25° C.: from 9 to 14 mPa·s, available from Toagosei Co., Ltd.

OXT212: 3-ethyl-3-[(2-ethylhexyloxy)methyl]oxetane, boiling point 133° C./1.33 kPa, viscosity at 25° C.: from 3 to 6 mPa·s, trade name "Aron oxetane OXT-212", available from Toagosei Co., Ltd.

ALOX: 3-allyloxyoxetane, boiling point 146° C./760 mmHg, viscosity at 25° C.: 9 mPa·s Curing Catalyst CPI-110P: a mixture of diphenyl[4-(phenylthio)phenyl]sulfonium hexafluorophoshate and thiodi-p-phenylene bis(diphenylsulfonium) bis(hexafluorophosphate) (99.5/0.5), trade name "CPI-110P", available from San-Apro Ltd.

Irg184: 1-hydroxy-cyclohexyl-phenyl-ketone, trade name "IRGACURE 184", available from BASF Sensitizer UVS1331: 9,10-dibuthoxy anthracene, trade name "Anthracure UVS-1331", available from Kawasaki Kasei Chemicals Ltd.

UVS581: 9,10-di(caprylonyloxy)anthracene, trade name "Anthracure UVS-581", available from Kawasaki Kasei Chemicals Ltd.

Dispersant

Trade name "Adisper", polymeric pigment dispersant, available from Ajinomoto Fine-Techno Co. Inc To summarize the above, configurations according to an embodiment of the present invention and variations thereof will be described below.

(1) A monomer mixture containing at least: a compound represented by Formulas (a-1) and/or (a-2); a compound (2B) including two cationically polymerizable groups per molecule, at least one of the cationically polymerizable groups being an epoxy group; a compound (3B) including three or more cationically polymerizable groups per molecule, at least one of the cationically polymerizable groups being an epoxy group; and a compound represented by Formula (c-1); wherein a total content of the compound represented by Formula (a-1) above and the compound represented by Formula (a-2) above is from 1 to 20 wt. % of a total amount of the monomer mixture; a ratio of contents of the compound (2B)/the compound (3B) is from 0.1 to 3.0; and a content of the compound represented by Formula (c-1) above is from 5 to 95 wt. % of the total amount of the monomer mixture.

(2) The monomer mixture according to (1), wherein a total content of the compound (2B) and the compound (3B) is from 10 to 50 wt. % of the total amount of the monomer mixture.

(3) The monomer mixture according to (1) or (2), wherein the compound (2B) is a compound represented by Formula (2b-1).

(4) The monomer mixture according to (1) or (2), wherein the compound (2B) is at least one type of compound selected from 3,4-epoxycyclohexylmethyl(3,4-epoxy)cyclohexane carboxylate, (3,4,3',4'-diepoxy)bicyclohexyl, bis(3,4-epoxycyclohexylmethyl)ether, 1,2-epoxy-1,2-bis(3,4-epoxycyclohexan-1-yl)ethane, 2,2-bis(3,4-epoxycyclohexan-1-yl)propane, and 1,2-bis(3,4-epoxycyclohexan-1-yl)ethane.

(5) The monomer mixture according to any one of (1) to (4), wherein the compound (3B) is a compound (3b') including three or more glycidyl ether groups per molecule.

(6) The monomer mixture according to (5), wherein the compound (3b') including three or more glycidyl ether groups per molecule is a compound represented by Formula (3b-1).

(7) The monomer mixture according to (5) or (6), wherein a content of the compound (3b') is 70 wt. % or greater (preferably 80 wt. % or greater, particularly preferably 90 wt. % or greater, and most preferably 95 wt. % or greater) of a total amount of the compound (3B).

(8) The monomer mixture according to any one of (5) to (7), wherein the content of the compound (3b') is from 1 to 40 wt. % (preferably from 5 to 30 wt. %, particularly preferably from 10 to 30 wt. %, and most preferably from 10 to 25 wt. %) of the total amount of the monomer mixture.

(9) The monomer mixture according to any one of (1) to (8), further containing a vinyl ether compound including an aliphatic backbone in an amount from 1 to 30 wt. % (preferably from 1 to 20 wt. %, particularly preferably from 3 to 15 wt. %, and most preferably from 5 to 10 wt. %) of the total amount of the monomer mixture.

(10) The monomer mixture according to (9), wherein the vinyl ether compound including an aliphatic backbone is a vinyl ether compound represented by Formula (a-3), where R in the formula is an aliphatic hydrocarbon group or a group in which two or more aliphatic hydrocarbon groups are bonded via a linking group (preferably an ether bond).

(11) The monomer mixture according to (9) or (10), wherein a sum of contents of the compound represented by Formula (a-1), the compound represented by Formula (a-2), and the vinyl ether compound including an aliphatic backbone is 70 wt. % or greater (preferably 80 wt. % or greater, particularly preferably 90 wt. % or greater, and most preferably 95 wt. % or greater) of a total amount of the compound (A) included in the monomer mixture.

(12) The monomer mixture according to any one of (9) to (11), wherein the sum of contents of the compound represented by Formula (a-1), the compound represented by Formula (a-2), and the vinyl ether compound including an aliphatic backbone is from 1 to 30 wt. % (preferably from 5 to 25 wt. % and particularly preferably from 10 to 25 wt. %) of the total amount of the monomer mixture.

(13) The monomer mixture according to any one of (1) to (12), further containing an oxetane compound having a viscosity of 10 mPa·s or less in an amount from 1 to 20 wt. % (preferably from 3 to 20 wt. %, particularly preferably from 5 to 15 wt. %, and most preferably from 10 to 15 wt. %) of the total amount of the monomer mixture.

(14) The monomer mixture according to (13), wherein the oxetane compound having a viscosity of 10 mPa·s or less is an oxetane compound having a viscosity of 10 mPa·s or less and a boiling point of 80° C. or higher under normal pressure.

(15) The monomer mixture according to (13) or (14), wherein the oxetane compound having a viscosity of 10 mPa·s or less is at least one type of compound selected from compounds represented by Formulas (c-2-5), (c-2-12), and (c-2-13).

(16) The monomer mixture according to any one of (1) to (15), wherein a content of a compound including only one cationically polymerizable group selected from a vinyl ether group, an epoxy group, and an oxetanyl group per molecule is 30 wt. % or less of the total amount of the monomer mixture.

(17) The monomer mixture according to any one of (1) to (16), wherein a content of a compound including two cationically polymerizable groups selected from a vinyl ether group, an epoxy group, and an oxetanyl group per molecule is 30 wt. % or greater of the total amount of the monomer mixture.

(18) A curable composition containing the monomer mixture described in any one of (1) to (17) and a curing catalyst.

(19) The curable composition according to (18), containing a sensitizer, or a sensitizer and a sensitization auxiliary agent.

(20) The curable composition according to (19), containing, as a sensitizer, a compound represented by Formula (d-1) and a compound represented by Formula (d-2) in a ratio (weight ratio) of the compound represented by Formula (d-1) above/the compound represented by Formula (d-2) above from 0.1 to 1.0 (preferably from 0.1 to 0.5 and particularly preferably from 0.2 to 0.5).

(21) The curable composition according to any one of (18) to (20), containing a coloring material.

(22) The curable composition according to any one of (18) to (21), containing a dispersant.

(23) The curable composition according to any one of (18) to (22), wherein a surface tension is from 10 to 50 mN/m at 25° C. under 1 atm.

(24) The curable composition according to any one of (18) to (23), wherein a viscosity at 25° C. and a shear rate of 100 s$^{-1}$ is from 1 to 1000 mPa·s.

(25) The curable composition according to any one of (18) to (24), which is an ultraviolet-curable inkjet ink.

(26) A cured product of the curable composition described in any one of (18) to (25).

(27) A molded article including the cured product described in (26).

(28) A method for producing a molded article, wherein the curable composition described in any one of (18) to (25) is discharged by an inkjet method, and then the discharged curable composition is cured to obtain a molded article including a cured product of the curable composition.

(29) A structure including the cured product described in (26) on a surface of a substrate.

INDUSTRIAL APPLICABILITY

The curable composition obtained by adding a curing catalyst to the monomer mixture according to an embodiment of the present invention has low viscosity and thus excellent coatability or dischargeabiliy before ultraviolet irradiation. The curable composition can be rapidly cured by ultraviolet irradiation even in the presence of oxygen or moisture to form a cured product having high hardness, excellent alkali resistance, and excellent adhesion to a substrate. In addition, the curable composition has excellent storage stability. Furthermore, the curable composition has excellent curability and can significantly reduce odor generation caused by an unreacted monomer. Thus, the curable composition can be suitably used as an ultraviolet-curable inkjet ink.

The invention claimed is:

1. A monomer mixture containing at least:
a compound represented by Formulas (a-1) and/or (a-2):

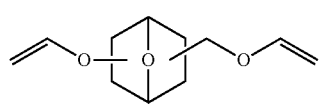
(a-1)

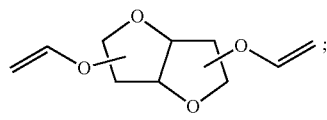
(a-2)

a compound (2B'), represented by Formula (2b-1):

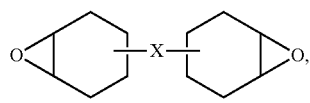
(2b-1)

where X represents a single bond or a linking group;

a compound (3B') represented by Formula (3b-1):

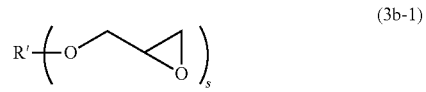
(3b-1)

where each R' represents an aliphatic hydrocarbon group, and s represents an integer of 3 to 6, and
a compound represented by Formula (c-1):

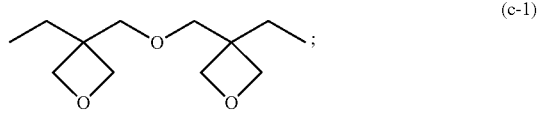
(c-1)

wherein a total content of the compound represented by Formula (a-1) and the compound represented by Formula (a-2) is from 1 to 20 wt. % of a total amount of the monomer mixture;
a content of the compound represented by Formula (c-1) is from 5 to 95 wt. % of the total amount of the monomer mixture, and
the monomer mixture meets one of conditions [1] and [2] as follows:
[1] a weight ratio of contents of the compound (2B')/the compound (3B') is from 0.1 to 0.8; and
[2] a weight ratio of contents of the compound (2B')/the compound (3B') is from greater than 0.8 to 1.8, and a content of a compound or compounds containing two or more oxetanyl groups per molecule, including the compound represented by Formula (c-1), is from 45 to 95 wt. % of the total amount of the monomer mixture.

2. The monomer mixture according to claim 1, wherein a total content of the compound (2B') and the compound (3B') is from 10 to 50 wt. % of the total amount of the monomer mixture, and
a content of the compound represented by Formula (c-1) is from 5 to 80 wt. % of the total amount of the monomer mixture.

3. The monomer mixture according to claim 1, wherein the compound (2B') is a compound represented by Formula (2b-1):

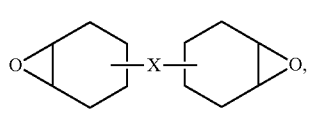
(2b-1)

where X represents a linking group.

4. The monomer mixture according to claim 1, wherein the "s" in Formula (3b-1) is an integer of 3.

5. The monomer mixture according to claim 1, wherein a content of a compound including only one cationically polymerizable group selected from a vinyl ether group, an epoxy group, and an oxetanyl group per molecule is 30 wt. % or less of the total amount of the monomer mixture.

6. A curable composition comprising the monomer mixture described in claim 1 and a curing catalyst.

7. The curable composition according to claim 6, comprising a sensitizer, or a sensitizer and a sensitization auxiliary agent.

8. The curable composition according to claim 6, containing a coloring material.

9. The curable composition according to claim 6, containing a dispersant.

10. The curable composition according to claim 6, which is an ultraviolet-curable inkjet ink.

11. A method of producing a molded article comprising: ejecting the curable composition described in claim 10 using an inkjet method, then curing the ejected curable composition, and forming a molded article from a cured product of the curable composition.

12. A cured product of the curable composition described in claim 6.

13. A molded article comprising the cured product described in claim 12.

14. A structure comprising the cured product described in claim 12 on a substrate surface.

15. The monomer mixture according to claim 1, wherein the compound (2B') is at least one compound selected from 3,4-epoxycyclohexylmethyl(3,4-epoxy)cyclohexane carboxylate, (3,4,3',4'-diepoxy)bicyclohexyl, bis(3,4-epoxycyclohexylmethyl)ether, 1,2-epoxy-1,2-bis(3,4-epoxycyclohexan-1-yl)ethane, 2,2-bis(3,4-epoxycyclohexan-1-yl)propane, and 1,2-bis(3,4-epoxycyclohexan-1-yl)ethane.

16. The monomer mixture according to claim 1, wherein the compound (3B') is at least one compound selected from trimethylolethane triglycidyl ether, trimethylolpropane triglycidyl ether, pentaerythritol triglycidyl ether, pentaerythritol tetraglycidyl ether, glycerin triglycidyl ether, and dipentaerythritol hexaglycidyl ether.

17. The monomer mixture according to claim 1, wherein the compound (2B') is a compound represented by Formula (2b-1):

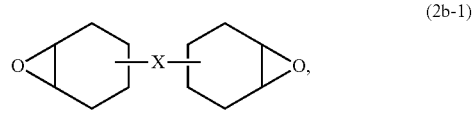

where X represents a single bond.

18. The monomer mixture according to claim 1, wherein the "s" in Formula (3b-1) is an integer of 4-6.

* * * * *